US012029689B2

(12) United States Patent
Konsin et al.

(10) Patent No.: US 12,029,689 B2
(45) Date of Patent: Jul. 9, 2024

(54) CONTROLS FOR SURGICAL SUPPORT APPARATUS

(71) Applicant: Allen Medical Systems, Inc., Batesville, IN (US)

(72) Inventors: Zachary B. Konsin, Brighton, MA (US); Michael C. Pierce, Harvard, MA (US); Alexander E. Rojas, Waltham, MA (US); Christopher B. Dubois, Lincoln, RI (US); Phillip B. Dolliver, Framingham, MA (US); Jason S. Bernotsky, Dunmore, PA (US); Andrew L. Thompson, Townsend, MA (US); David C. Newkirk, Lawrenceburg, IN (US); Todd P. O'Neal, Fairfield, OH (US)

(73) Assignee: Allen Medical Systems, Inc., Batesville, IN (US)

( * ) Notice: Subject to any disclaimer, the term of this patent is extended or adjusted under 35 U.S.C. 154(b) by 0 days.

(21) Appl. No.: 18/229,268

(22) Filed: Aug. 2, 2023

(65) Prior Publication Data

US 2023/0372175 A1 Nov. 23, 2023

Related U.S. Application Data

(63) Continuation of application No. 18/067,785, filed on Dec. 19, 2022, now Pat. No. 11,752,055, which is a (Continued)

(51) Int. Cl.
*A61G 13/02* (2006.01)
*A61G 7/008* (2006.01)

(Continued)

(52) U.S. Cl.
CPC ............ *A61G 13/02* (2013.01); *A61G 7/008* (2013.01); *A61G 7/012* (2013.01); *A61G 13/04* (2013.01);

(Continued)

(58) Field of Classification Search
CPC ...... A61G 13/02; A61G 7/008; A61G 13/122; A61G 13/0054; A61G 2200/325; A61G 2200/327
See application file for complete search history.

(56) References Cited

U.S. PATENT DOCUMENTS 1,021,335 A 3/1912 Robinson et al.
1,098,477 A 6/1914 Cashman (Continued)

FOREIGN PATENT DOCUMENTS

DE 1162508 2/1964
DE 3438956 5/1985

(Continued)

OTHER PUBLICATIONS

"Trios® Simplified adjustability and positioning" from Mizuho|OSI®; © 2017; 12 pages.

(Continued)

*Primary Examiner* — Fredrick C Conley
(74) *Attorney, Agent, or Firm* — Barnes & Thornburg LLP

(57) ABSTRACT

Devices, systems, and methods for patient support include arrangement of a patient support top for rotation and a rotation lockout assembly for selectively blocking against rotation of the patient support top.

20 Claims, 18 Drawing Sheets

Related U.S. Application Data continuation of application No. 17/537,703, filed on Nov. 30, 2021, now Pat. No. 11,554,068, which is a continuation of application No. 16/038,519, filed on Jul. 18, 2018, now Pat. No. 11,213,448.

(60) Provisional application No. 62/539,484, filed on Jul. 31, 2017.

(51) Int. Cl.

| | |
|---|---|
| ***A61G 7/012*** | (2006.01) |
| ***A61G 13/04*** | (2006.01) |
| ***A61G 13/12*** | (2006.01) |
| *A61G 13/00* | (2006.01) |

(52) U.S. Cl.
CPC ........ *A61G 13/122* (2013.01); *A61G 13/0054* (2016.11); *A61G 2200/325* (2013.01); *A61G 2200/327* (2013.01); *A61G 2203/42* (2013.01)

(56) References Cited

U.S. PATENT DOCUMENTS 1,160,451 A 11/1915 Sanford
1,171,713 A 2/1916 Gilkerson
1,372,565 A 3/1921 Skelly
1,528,835 A 3/1925 McCollough
1,662,464 A 3/1928 McCutchen
1,799,692 A 4/1931 Knott
1,938,006 A 12/1933 Blanchard
2,103,693 A 12/1937 Ernst
2,188,592 A 1/1940 Hosken
2,261,297 A 11/1941 Anthony
2,337,505 A 12/1942 Swift
2,452,816 A 11/1948 Wagner
2,509,086 A 5/1950 Eaton
2,613,371 A 10/1952 Keyes
2,636,793 A 4/1953 Mayer
2,667,169 A 1/1954 Kambourakis
2,688,410 A 9/1954 Nelson
2,691,979 A 10/1954 Watson
2,764,150 A 9/1956 Ettinger
2,792,945 A 5/1957 Brenny
2,803,022 A 8/1957 Wyhnkoop
2,880,720 A 4/1959 Houghtaling
2,935,286 A 5/1960 Skelt
3,046,071 A 7/1962 Shampaine et al.
3,046,072 A 7/1962 Douglass, Jr. et al.
3,049,726 A 8/1962 Getz
3,090,381 A 5/1963 Watson
3,099,441 A 7/1963 Frederuck
3,188,079 A 6/1965 Boetcker et al.
3,226,734 A 3/1966 Coventon
3,238,539 A 3/1966 Koch
3,281,141 A 10/1966 Smiley et al.
3,282,584 A 11/1966 Anderson
3,286,707 A 11/1966 Shafer
3,302,218 A 2/1967 Stryker
3,388,700 A 6/1968 Kindle
3,428,307 A 2/1969 Hunter et al.
3,434,165 A 3/1969 Keane
3,584,321 A 6/1971 Buchanan
3,599,964 A 8/1971 Magni
3,640,416 A 2/1972 Temple
3,652,851 A 3/1972 Zaalberg
3,739,406 A 6/1973 Koetter
3,745,996 A 7/1973 Rush, Sr.
3,751,028 A 8/1973 Scheininger et al.
3,766,384 A 10/1973 Anderson
3,795,018 A 3/1974 Broaded
3,814,414 A 6/1974 Chapa
3,827,089 A 8/1974 Grow
3,828,377 A 8/1974 Fary, Sr.
3,832,742 A 9/1974 Stryker
3,859,982 A 1/1975 Dove
3,873,061 A 3/1975 Smith
3,890,668 A 6/1975 Stosberg et al.
3,895,403 A 7/1975 Davis
3,930,548 A 1/1976 Wallraff
3,946,452 A 3/1976 Eary, Sr.
3,947,686 A 3/1976 Cooper et al.
3,949,983 A 4/1976 Tommasino
3,988,790 A 11/1976 Mracek et al.
4,018,412 A 4/1977 Kees, Jr. et al.
4,054,282 A 10/1977 Hamer
4,071,916 A 2/1978 Nelson
4,101,120 A 7/1978 Seshima
4,108,426 A 8/1978 Lindstroem et al.
4,131,802 A 12/1978 Braden et al.
4,139,917 A 2/1979 Fenwick
4,143,652 A 3/1979 Meier et al.
4,144,880 A 3/1979 Daniels
4,175,550 A 11/1979 Leininger et al.
4,186,917 A 2/1980 Rais et al.
4,205,413 A 6/1980 Collignon et al.
4,225,125 A 9/1980 Lee
4,227,269 A 10/1980 Johnston
4,239,039 A 12/1980 Thompson
4,244,358 A 1/1981 Pyers
4,248,445 A 2/1981 Vassar
4,257,407 A 3/1981 Macchi
4,355,631 A 10/1982 LeVahn
4,356,577 A 11/1982 Taylor et al.
4,383,351 A 5/1983 Fenwick
4,384,378 A 5/1983 Getz et al.
4,398,707 A 8/1983 Cloward
4,425,673 A 1/1984 Werner
4,459,712 A 7/1984 Pathan
4,474,364 A 10/1984 Brendgord
4,484,911 A 11/1984 Berlin et al.
4,487,523 A 12/1984 Monroe
4,503,844 A 3/1985 Siczek
4,506,872 A 3/1985 Westerberg et al.
4,526,355 A 7/1985 Moore et al.
4,545,571 A 10/1985 Chambron
4,552,346 A 11/1985 Schnelle et al.
4,579,111 A 4/1986 Ledesma
4,583,725 A 4/1986 Arnold
4,658,450 A 4/1987 Thompson
4,667,365 A 5/1987 Martinek
4,671,728 A 6/1987 Clark et al.
4,712,781 A 12/1987 Watanabe
4,729,535 A 3/1988 Frazier et al.
4,730,606 A 3/1988 Leininger
4,763,643 A 8/1988 Vrzalik
4,771,785 A 9/1988 Duer
4,827,541 A 5/1989 Vollman et al.
4,840,362 A 6/1989 Bremer et al.
4,840,363 A 6/1989 McConnell
4,850,775 A 7/1989 Lee et al.
4,852,840 A 8/1989 Marks
4,856,128 A 8/1989 Alsip et al.
4,866,796 A 9/1989 Robinson et al.
4,868,937 A 9/1989 Connolly
4,872,657 A 10/1989 Lüssi
4,887,325 A 12/1989 Tesch
4,901,963 A 2/1990 Yoder
4,901,964 A 2/1990 McConnell
4,923,187 A 5/1990 Mombrinie
4,924,537 A 5/1990 Alsip et al.
4,937,901 A 7/1990 Brennan
4,939,801 A 7/1990 Schaael et al.
4,944,054 A 7/1990 Bossert
4,944,500 A 7/1990 Mueller et al.
4,947,496 A 8/1990 Connolly
4,953,245 A 9/1990 Jung
4,970,737 A 11/1990 Sagel
4,971,037 A 11/1990 Pelta
4,989,848 A 2/1991 Monroe
4,998,320 A 3/1991 Lange
5,020,170 A 6/1991 Ruf
5,088,706 A 2/1992 Jackson
5,108,213 A 4/1992 Shields
5,121,892 A 6/1992 Herzog

(56) References Cited

U.S. PATENT DOCUMENTS

| | | | |
|---|---|---|---|
| 5,131,106 | A | 7/1992 | Jackson |
| 5,135,210 | A | 8/1992 | Michaelson |
| 5,152,024 | A | 10/1992 | Chrones et al. |
| 5,161,267 | A | 11/1992 | Smith |
| 5,181,289 | A | 1/1993 | Kassai |
| 5,210,887 | A | 5/1993 | Kershaw |
| 5,210,888 | A | 5/1993 | Canfield |
| 5,231,741 | A | 8/1993 | Maguire |
| 5,239,716 | A | 8/1993 | Fisk |
| 5,274,862 | A | 1/1994 | Palmer, Jr. et al. |
| 5,276,927 | A | 1/1994 | Day |
| 5,287,575 | A | 2/1994 | Allen et al. |
| 5,320,444 | A | 6/1994 | Bookwalter et al. |
| 5,333,334 | A | 8/1994 | Kassai |
| 5,393,018 | A | 2/1995 | Roth et al. |
| 5,400,772 | A | 3/1995 | LeVahn et al. |
| 5,404,603 | A | 4/1995 | Fukai et al. |
| 5,418,990 | A | 5/1995 | Risåsen |
| 5,444,882 | A | 8/1995 | Andrews et al. |
| 5,461,740 | A | 10/1995 | Pearson |
| 5,483,323 | A | 1/1996 | Matsuda et al. |
| 5,487,195 | A | 1/1996 | Ray |
| 5,499,408 | A | 3/1996 | Nix |
| 5,502,853 | A | 4/1996 | Singleton et al. |
| 5,503,416 | A | 4/1996 | Aoki et al. |
| 5,524,304 | A | 6/1996 | Shutes |
| 5,538,215 | A | 7/1996 | Hosey |
| 5,544,371 | A | 8/1996 | Fuller |
| 5,579,550 | A | 12/1996 | Bathrick et al. |
| 5,588,215 | A | 12/1996 | Chang |
| 5,613,254 | A | 3/1997 | Clayman et al. |
| 5,626,362 | A | 5/1997 | Mottola |
| 5,658,315 | A | 8/1997 | Lamb et al. |
| 5,673,443 | A | 10/1997 | Marmor |
| 5,701,991 | A | 12/1997 | Helmetsie |
| 5,737,781 | A | 4/1998 | Votel |
| 5,741,210 | A | 4/1998 | Dobrovoiny |
| 5,758,374 | A | 6/1998 | Ronci |
| 5,778,467 | A | 7/1998 | Scott et al. |
| 5,794,286 | A | 8/1998 | Scott |
| 5,836,026 | A | 11/1998 | Reed |
| 5,836,559 | A | 11/1998 | Ronci |
| 5,889,469 | A | 3/1999 | Mykytiuk et al. |
| 5,890,238 | A | 4/1999 | Votel |
| 5,901,388 | A | 5/1999 | Cowan |
| 5,926,871 | A | 7/1999 | Howard |
| 5,928,101 | A | 7/1999 | Hancock et al. |
| 5,937,456 | A | 8/1999 | Norris |
| 5,950,259 | A | 9/1999 | Boggs |
| 6,003,174 | A | 12/1999 | Kantrowitz et al. |
| 6,035,465 | A | 3/2000 | Rogozinski |
| 6,049,923 | A | 4/2000 | Ochiai |
| 6,076,525 | A | 6/2000 | Hoffman |
| 6,094,760 | A | 8/2000 | Nonaka et al. |
| 6,108,838 | A | 8/2000 | Connolly et al. |
| 6,112,349 | A | 9/2000 | Connolly |
| 6,120,397 | A | 9/2000 | Julian |
| 6,154,901 | A | 12/2000 | Carr |
| 6,161,849 | A | 12/2000 | Schweninger |
| 6,230,342 | B1 | 5/2001 | Haugs |
| 6,260,220 | B1 | 7/2001 | Lamb et al. |
| 6,282,736 | B1 | 9/2001 | Hand et al. |
| 6,286,164 | B1 | 9/2001 | Lamb et al. |
| 6,286,183 | B1 | 9/2001 | Stickel et al. |
| 6,295,671 | B1 | 10/2001 | Reesby et al. |
| 6,311,349 | B1 | 11/2001 | Kazakia et al. |
| 6,315,564 | B1 | 11/2001 | Levisman |
| 6,320,510 | B2 | 11/2001 | Menkedick et al. |
| 6,324,710 | B1 | 12/2001 | Hernandez et al. |
| 6,382,576 | B1 | 5/2002 | Heimbrock |
| 6,385,801 | B1 | 5/2002 | Watanabe et al. |
| 6,421,854 | B1 | 7/2002 | Heimbrock |
| 6,438,777 | B1 | 7/2002 | Bender |
| 6,490,737 | B1 | 12/2002 | Mazzei et al. |
| 6,496,991 | B1 | 12/2002 | Votel |
| 6,499,158 | B1 | 12/2002 | Easterling |
| 6,499,160 | B2 | 12/2002 | Hand et al. |
| 6,502,669 | B1 | 1/2003 | Harris |
| 6,505,365 | B1 | 1/2003 | Hanson et al. |
| 6,523,197 | B2 | 2/2003 | Zitzmann |
| 6,526,610 | B1 | 3/2003 | Hand et al. |
| 6,584,630 | B1 | 7/2003 | Dinkler |
| 6,609,260 | B2 | 8/2003 | Hand et al. |
| 6,615,430 | B2 | 9/2003 | Heimbrock |
| 6,622,324 | B2 | 9/2003 | VanSteenburg et al. |
| 6,622,980 | B2 | 9/2003 | Boucher et al. |
| 6,634,043 | B2 | 10/2003 | Lamb et al. |
| 6,638,299 | B2 | 10/2003 | Cox |
| 6,662,388 | B2 | 12/2003 | Friel et al. |
| 6,662,391 | B2 | 12/2003 | Wilson et al. |
| 6,663,055 | B2 | 12/2003 | Boucher et al. |
| 6,668,396 | B2 | 12/2003 | Wei |
| 6,668,965 | B2 | 12/2003 | Strong |
| 6,671,904 | B2 | 1/2004 | Easterling |
| 6,681,423 | B2 | 1/2004 | Zachrisson |
| 6,691,347 | B2 | 2/2004 | Hand et al. |
| 6,691,350 | B2 | 2/2004 | Weismiller |
| 6,701,553 | B1 | 3/2004 | Hand et al. |
| 6,701,554 | B2 | 3/2004 | Heimbrock |
| 6,721,976 | B2 | 4/2004 | Schwaerle |
| 6,735,794 | B1 | 5/2004 | Way et al. |
| 6,754,923 | B2 | 6/2004 | Borders et al. |
| 6,813,788 | B2 | 11/2004 | Dinkler et al. |
| 6,817,363 | B2 | 11/2004 | Biondo et al. |
| 6,854,137 | B2 | 2/2005 | Johnson |
| 6,857,144 | B1 | 2/2005 | Huang |
| 6,859,967 | B2 | 3/2005 | Harrison et al. |
| 6,862,759 | B2 | 3/2005 | Hand et al. |
| 6,862,761 | B2 | 3/2005 | Hand et al. |
| 6,865,775 | B2 | 3/2005 | Ganace |
| 6,874,181 | B1 | 4/2005 | Connolly et al. |
| 6,886,199 | B1 | 5/2005 | Schwaegerle |
| 6,898,811 | B2 | 5/2005 | Zucker et al. |
| 6,912,959 | B2 | 7/2005 | Kolody et al. |
| 6,928,676 | B1 | 8/2005 | Schwaegerle |
| 6,941,951 | B2 | 9/2005 | Hubert et al. |
| 6,951,034 | B2 | 10/2005 | Shiery et al. |
| 6,966,081 | B1 | 11/2005 | Sharps et al. |
| 6,971,997 | B1 | 12/2005 | Ryan et al. |
| 6,986,179 | B2 | 1/2006 | Varadharajulu et al. |
| 7,017,228 | B2 | 3/2006 | Silverstein et al. |
| 7,020,917 | B1 | 4/2006 | Kolody et al. |
| 7,086,103 | B2 | 8/2006 | Barthelt |
| 7,089,612 | B2 | 8/2006 | Rocher et al. |
| 7,089,884 | B2 | 8/2006 | Wang et al. |
| 7,103,932 | B1 | 9/2006 | Kandora |
| 7,137,160 | B2 | 11/2006 | Hand et al. |
| 7,152,261 | B2 | 12/2006 | Jackson |
| 7,159,695 | B2 | 1/2007 | Strong |
| 7,171,709 | B2 | 2/2007 | Weismiller |
| 7,197,778 | B2 | 4/2007 | Sharps |
| 7,200,892 | B2 | 4/2007 | Block et al. |
| 7,216,385 | B2 | 5/2007 | Hill |
| 7,234,180 | B2 | 6/2007 | Horton et al. |
| 7,290,302 | B2 | 11/2007 | Sharps |
| 7,343,635 | B2 | 3/2008 | Jackson |
| 7,343,916 | B2 | 3/2008 | Biondo et al. |
| 7,496,980 | B2 | 3/2009 | Sharps |
| 7,520,007 | B2 | 4/2009 | Skripps |
| 7,520,008 | B2 | 4/2009 | Wong et al. |
| 7,565,708 | B2 | 7/2009 | Jackson |
| 7,600,281 | B2 | 10/2009 | Skripps |
| 7,603,731 | B2 | 10/2009 | Bradcovich |
| D603,967 | S | 11/2009 | Berry et al. |
| 7,653,953 | B2 | 2/2010 | Lopez-Sansalvador |
| 7,669,262 | B2 | 3/2010 | Skripps et al. |
| 7,681,269 | B2 | 3/2010 | Biggie et al. |
| 7,690,059 | B2 | 4/2010 | Lemire et al. |
| 7,694,369 | B2 | 4/2010 | Hinders et al. |
| 7,739,762 | B2 | 6/2010 | Lamb et al. |
| 7,810,185 | B2 | 10/2010 | Bürstner et al. |
| 7,882,583 | B2 | 2/2011 | Skripps |
| 7,931,607 | B2 | 4/2011 | Biondo et al. |
| 7,954,996 | B2 | 6/2011 | Boomgaarden et al. |

(56) References Cited

U.S. PATENT DOCUMENTS

| | | | |
|---|---|---|---|
| 8,006,332 | B2 | 8/2011 | Lemire et al. |
| D645,967 | S | 9/2011 | Sharps |
| 8,020,227 | B2 | 9/2011 | Dimmer et al. |
| 8,042,208 | B2 | 10/2011 | Gilbert et al. |
| 8,056,163 | B2 | 11/2011 | Lemire et al. |
| 8,060,960 | B2 | 11/2011 | Jackson |
| 8,118,029 | B2 | 2/2012 | Gneiting et al. |
| 8,196,237 | B2 | 6/2012 | Herbst et al. |
| D663,427 | S | 7/2012 | Sharps |
| D665,912 | S | 8/2012 | Skripps |
| 8,234,730 | B2 | 8/2012 | Skripps |
| 8,234,731 | B2 | 8/2012 | Skripps |
| 8,256,050 | B2 | 9/2012 | Wong et al. |
| 8,286,283 | B2 | 10/2012 | Copeland et al. |
| D676,971 | S | 2/2013 | Sharps |
| 8,381,331 | B2 | 2/2013 | Sharps et al. |
| 8,397,323 | B2 | 3/2013 | Skripps et al. |
| D683,032 | S | 5/2013 | Sharps |
| 8,486,068 | B2 | 7/2013 | Starr |
| 8,555,439 | B2 | 10/2013 | Soto et al. |
| 8,584,281 | B2 | 11/2013 | Diel et al. |
| 8,590,074 | B2 | 11/2013 | Hornbach et al. |
| 8,635,725 | B2 | 1/2014 | Tannoury et al. |
| 8,676,293 | B2 | 3/2014 | Breen et al. |
| 8,677,529 | B2 | 3/2014 | Jackson |
| 8,707,476 | B2 | 4/2014 | Sharps |
| 8,707,484 | B2 | 4/2014 | Jackson et al. |
| 8,719,979 | B2 | 5/2014 | Jackson |
| 8,732,876 | B2 | 5/2014 | Lachenbruch et al. |
| 8,763,178 | B1 | 7/2014 | Martin et al. |
| 8,777,878 | B2 | 7/2014 | Deitz |
| 8,782,832 | B2 | 7/2014 | Blyakher et al. |
| 8,806,679 | B2 | 8/2014 | Soto et al. |
| 8,826,474 | B2 | 9/2014 | Jackson |
| 8,826,475 | B2 | 9/2014 | Jackson |
| 8,833,707 | B2 | 9/2014 | Steinberg et al. |
| 8,839,471 | B2 | 9/2014 | Jackson |
| 8,844,077 | B2 | 9/2014 | Jackson et al. |
| 8,845,264 | B2 | 9/2014 | Kubiak et al. |
| 8,856,986 | B2 | 10/2014 | Jackson |
| 8,864,205 | B2 | 10/2014 | Lemire et al. |
| 8,893,333 | B2 | 11/2014 | Soto et al. |
| D720,076 | S | 12/2014 | Sharps et al. |
| 8,938,826 | B2 | 1/2015 | Jackson |
| 8,978,180 | B2 | 3/2015 | Jackson |
| 8,997,286 | B2 | 4/2015 | Wyslucha et al. |
| 9,072,646 | B2 | 7/2015 | Skripps et al. |
| 9,498,397 | B2 | 11/2016 | Hight et al. |
| 9,757,299 | B2 | 9/2017 | Hight et al. |
| 9,968,503 | B2 | 5/2018 | Hight et al. |
| 11,213,448 | B2 | 1/2022 | Konsin et al. |
| 11,554,068 | B2 | 1/2023 | Konsin et al. |
| 11,752,055 | B2 | 9/2023 | Konsin et al. |
| 2002/0138906 | A1 | 10/2002 | Bartlett et al. |
| 2004/0123389 | A1 | 7/2004 | Boucher et al. |
| 2004/0133983 | A1 | 7/2004 | Newkirk et al. |
| 2006/0010643 | A1 | 1/2006 | Hornbach et al. |
| 2006/0185091 | A1 | 8/2006 | Jackson |
| 2007/0174965 | A1 | 8/2007 | Lemire et al. |
| 2008/0222811 | A1 | 9/2008 | Gilbert et al. |
| 2011/0247903 | A1 | 10/2011 | Boukhny et al. |
| 2012/0198625 | A1 | 8/2012 | Jackson |
| 2013/0111666 | A1 | 5/2013 | Jackson |
| 2013/0205500 | A1 | 8/2013 | Jackson |
| 2013/0219623 | A1 | 8/2013 | Jackson |
| 2013/0254995 | A1 | 10/2013 | Jackson |
| 2013/0254996 | A1 | 10/2013 | Jackson |
| 2013/0254997 | A1 | 10/2013 | Jackson |
| 2013/0269710 | A1 | 10/2013 | Hight et al. |
| 2013/0312181 | A1 | 11/2013 | Jackson et al. |
| 2013/0312187 | A1 | 11/2013 | Jackson |
| 2013/0312188 | A1 | 11/2013 | Jackson |
| 2013/0326813 | A1 | 12/2013 | Jackson |
| 2014/0007349 | A1 | 1/2014 | Jackson |
| 2014/0020181 | A1 | 1/2014 | Jackson |
| 2014/0033436 | A1 | 2/2014 | Jackson |
| 2014/0068861 | A1 | 3/2014 | Jackson et al. |
| 2014/0082842 | A1 | 3/2014 | Jackson |
| 2014/0109316 | A1 | 4/2014 | Jackson et al. |
| 2014/0173826 | A1 | 6/2014 | Jackson |
| 2014/0196212 | A1 | 7/2014 | Jackson |
| 2014/0201913 | A1 | 7/2014 | Jackson |
| 2014/0201914 | A1 | 7/2014 | Jackson |
| 2014/0208512 | A1 | 7/2014 | Jackson |
| 2014/0317847 | A1 | 10/2014 | Jackson |
| 2015/0059094 | A1 | 3/2015 | Jackson |
| 2015/0150743 | A1 | 6/2015 | Jackson |
| 2015/0202106 | A1 | 7/2015 | Hight et al. |
| 2015/0245969 | A1 | 9/2015 | Hight et al. |
| 2017/0027797 | A1 | 2/2017 | Dolliver et al. |
| 2017/0112698 | A1* | 4/2017 | Hight .................. A61G 13/104 |
| 2017/0202523 | A1 | 7/2017 | Jackson |
| 2017/0354563 | A1 | 12/2017 | McKenney et al. |
| 2019/0029906 | A1* | 1/2019 | Konsin .................. A61G 7/012 |
| 2022/0079826 | A1 | 3/2022 | Konsin et al. |
| 2023/0123610 | A1 | 4/2023 | Konsin et al. |

FOREIGN PATENT DOCUMENTS

| | | |
|---|---|---|
| DE | 3438956 | 11/1989 |
| DE | 4039907 | 7/1991 |
| DE | 19723927 | 12/1998 |
| DE | 4429062 | 8/2000 |
| DE | 10158470 | 6/2003 |
| DE | 202008001952 | 5/2008 |
| EP | 0617497 | 7/1990 |
| EP | 1210049 | 6/2002 |
| EP | 1686944 | 8/2006 |
| EP | 1159947 | 9/2006 |
| EP | 1982680 | 7/2011 |
| EP | 3158985 | 4/2017 |
| FR | 2247194 | 10/1977 |
| GB | 2210554 | 6/1989 |
| GB | 2210554 | 9/1989 |
| JP | 56-63353 | 5/1981 |
| JP | 4-14455 | 2/1992 |
| JP | 2001112582 | 4/2001 |
| WO | 1985000967 | 3/1985 |
| WO | 198600221 | 1/1986 |
| WO | 1999053997 | 10/1999 |
| WO | 2000062731 | 10/2000 |
| WO | 2002005740 | 1/2002 |
| WO | 2003096958 | 11/2003 |
| WO | 2004026212 | 4/2004 |
| WO | 2006006106 | 1/2006 |
| WO | 2006061606 | 6/2006 |

OTHER PUBLICATIONS

"Trios® Table Base," Owner's Manual. Ref 7803, 7803AP Mizuho Osi®; © 2015; 77 pages.

Extended EP Search Report for European Patent Application No. 18185330.0 dated Dec. 5, 2018; 7 pages.

* cited by examiner

CONTROLS FOR SURGICAL SUPPORT APPARATUS

The present application is a continuation of U.S. application Ser. No. 18/067,785, filed Dec. 19, 2022, now U.S. Pat. No. 11,752,055, which is a continuation of U.S. application Ser. No. 17/537,703, filed, Nov. 30, 2021, now U.S. Pat. No. 11,554,068, which is a continuation of U.S. application Ser. No. 16/038,519, filed Jul. 18, 2018, now U.S. Pat. No. 11,213,448, which claims the benefit, under 35 U.S.C. § 119(e), of U.S. Provisional Application No. 62/539,484, filed Jul. 31, 2017, and each of which is hereby incorporated by reference herein.

BACKGROUND

The present disclosure relates to devices, systems, and methods for patient support. More specifically, the present disclosure relates to devices, systems, and methods for surgical patient supports.

Patient supports, such as surgical support tables, provide support to various portions of a patient's body. Versatile positioning of table tops of the patient supports provides access to various parts of a patient's body. Positioning patient supports should be performed with consideration for the safety and security of the patient.

SUMMARY

The present application discloses one or more of the features recited in the appended claims and/or the following features which, alone or in any combination, may comprise patentable subject matter:

According to an aspect of the present disclosure, a patient support device may comprise a patient support top for providing support to a patient's body, an end support configured to support the patient support top for selective rotation about a rotation axis, and a rotation lockout assembly operable between a locked state to block against free rotation of the patient support top about the rotation axis and unlocked state to permit free rotation of the patient support top about the rotation axis. The rotation lockout assembly may include a rotation disk rotatable between locked and unlocked positions corresponding respectively with the locked and unlocked states of the rotation lockout assembly, and a lever arm pinned at one end to the rotation disk for traversing an arced path upon rotation of the rotation disk between locked and unlocked positions.

In some embodiments, the rotation lockout assembly may include a safety latch assembly for blocking against inadvertent rotation of the rotation disk. The safety latch assembly may include a trigger for deactivation to permit rotation of the rotation disk. In some embodiments, the safety latch assembly may include a key operable between a latched position engaged with the rotation disk to block rotation and an unlatched position disengaged from the rotation disk to allow rotation. In some embodiments, the trigger may include an arm having a contact end for operation by a user's hand and an indicator end for communicating with an actuator to operate the lock arm between the latched and unlatched positions.

In some embodiments, the rotation lockout assembly may include a crank handle configured for operation by a user's hand. The crank handle may extend from the rotation disk to provide leverage in rotating the rotation disk between the locked and unlocked positions. In some embodiments, the rotation disk may include a light indicator arranged proximate to the crank handle adapted to indicate whether the rotation disk is in the locked position by at least one of presence, absence, and color of light emitted and to indicate a position other than the locked position of the rotation disk by another one of presence, absence, and color of light emitted.

In some embodiments, the end support may include a primary shaft for supporting rotation of the patient support top and a rotation control assembly for controlled rotation of the primary shaft. The rotation control assembly may include a rotation plate selectively fixed against rotation relative to the primary shaft by arrangement of the rotation disk in the locked position. In some embodiments, the rotation plate may be selectively fixed for rotation with the primary shaft by operation of a locking collar between locked and unlocked positions corresponding respectively with the locked and unlocked positions of the rotation disk.

In some embodiments, the locking collar may be attached with the lever arm and may include a collar body and a number of locking pins extending from the collar body. The locking collar may be movable according to the position of the lever arm between an engaged position in which the number of locking pins engage with each of the rotation plate and a flange of the primary shaft to rotationally fix the rotation plate and the flange together, and a disengaged position in which the number of locking pins are disengaged from the flange of the primary shaft to release the rotation plate and the flange for relative rotation. In some embodiments, the rotation control assembly may include an actuator configured to provide controlled rotation to the rotation plate for transmission to the primary shaft when selectively fixed for rotation with the rotation plate. In some embodiments, the system may include a lockout control system for controlling the operation of the rotation lockout assembly between the locked and unlocked states, the lockout control system including at least one sensor arranged to detect connection of the patient support top with the end support.

According to another aspect of the present disclosure, an end support of a patient support device for supporting a patient support top for selective rotation about a rotation axis may comprise a primary shaft extending along the rotation axis, a rotation control assembly including a rotation plate and an actuator adapted to provide controlled rotation to the rotation plate, and a rotation lockout assembly operable between a locked state to block against free rotation of the primary shaft about the rotation axis and unlocked state to permit free rotation of the primary shaft about the rotation axis. The rotation lockout assembly may include a rotation disk rotatable between locked and unlocked positions corresponding respectively to the locked and unlocked states of the rotation lockout assembly, and a lever arm pinned at one end to the rotation disk and at another end to the end support for traversing an arced path upon rotation of the rotation disk between locked and unlocked positions.

In some embodiments, the rotation lockout assembly may include a safety latch assembly for blocking against inadvertent rotation of the rotation disk. The safety latch assembly may include a trigger for deactivation to permit rotation of the rotation disk. In some embodiments, the safety latch assembly may include a lock arm operable between a latched position engaged with the rotation disk to block rotation and an unlatched position disengaged from the rotation disk to allow rotation. In some embodiments, the trigger may include an arm having a contact end for operation by a user's hand and an indicator end for communicating with an actuator to operate the lock arm between the latched and unlatched positions.

In some embodiments, the rotation lockout assembly may include a crank handle configured for operation by a user's hand. The crank handle may extend from the rotation disk to provide leverage in rotating the rotation disk between the locked and unlocked positions. In some embodiments, the rotation lockout assembly may include a light indicator arranged proximate to the crank handle adapted to indicate whether the rotation disk is in the locked position by at least one of presence, absence, and color of light emitted and to indicate a position other than the locked position of the rotation disk by another one of presence, absence, and color of light emitted.

In some embodiments, the rotation plate may be selectively fixed for rotation with the primary shaft by operation of a locking collar between locked and unlocked positions corresponding respectively with the locked and unlocked positions of the rotation disk. The locking collar may be attached with the lever arm and includes a collar body and a number of locking pins extending from the collar body.

In some embodiments, the locking collar may be movable according to the position of the lever arm between an engaged position in which the number of locking pins engage with each of the rotation plate and a flange of the primary shaft to rotationally fix the rotation plate and the flange together, and a disengaged position in which the number of locking pins are disengaged from the flange of the primary shaft to release the rotation plate and the flange for relative rotation. In some embodiments, the actuator of the rotation control assembly may be configured to provide controlled rotation to the rotation plate for transmission of controlled rotation to the primary shaft when selectively fixed for rotation with the rotation plate. In some embodiments the end support may include a lockout control system for controlling the operation of the rotation lockout assembly between the locked and unlocked states, the lockout control system including at least one sensor arranged to detect connection of the patient support top with the end support.

According to another aspect of the present disclosure a patient support system may include at least one patient support top connected with at least one end support to support the at least patient support top above the floor for selective rotation about a rotation axis, a rotation lockout assembly operable between a locked state to block against free rotation of the at least one patient support top about the rotation axis and unlocked state to permit free rotation of the at least one patient support top about the rotation axis, and a lockout control system for controlling the operation of the rotation lockout assembly between the locked and unlocked states. The lockout control system may include at least one sensor arranged to detect connection of the at least one patient support top with the end support.

In some embodiments, the rotation lockout assembly may be adapted to block against free rotation of the patient support top unless the lockout control system indicates that least one patent support top is connected with the end support. In some embodiments, the at least one sensor may be arranged to communicate with the rotation lock assembly to indicate that the at least one patent support top is connected with the end support. In some embodiments, at least one patient support top may include two patient support tops. The at least one sensor may be arranged to communicate with the rotation lock assembly to indicate that the two patent support tops are connected with the end support.

In some embodiments, the rotation lockout assembly may be arranged blocked against operation out of the locked state unless the lockout control assembly indicates that the two patient support tops are connected with the end support and may permit operation into the unlocked state in response to communication from the lockout control assembly that the two patent support tops are connected with the end support.

In some embodiments, the rotation lockout assembly may include a rotation disk rotatable between locked and unlocked positions corresponding respectively to the locked and unlocked states of the rotation lockout assembly. In some embodiments, the rotation lockout assembly may include a lever arm pinned at one end to the rotation disk and at another end to the end support for traversing an arced path upon rotation of the rotation disk between locked and unlocked positions.

In some embodiments, the end support may include a primary shaft extending along the rotation axis to receive connection with the at least one support top. The end support may include a rotation control assembly having a rotation plate and an actuator adapted to provide controlled rotation to the rotation plate. The rotation plate may be selectively fixed for rotation with the primary shaft by operation of a locking collar between locked and unlocked positions corresponding respectively with the locked and unlocked positions of the rotation disk.

In some embodiments, the locking collar may be attached with the lever arm and may include a collar body and a number of locking pins extending from the collar body. The locking collar may be movable according to the position of the lever arm between an engaged position in which the number of locking pins engage with each of the rotation plate and a flange of the primary shaft to rotationally fix the rotation plate and the flange together, and a disengaged position in which the number of locking pins are disengaged from the flange of the primary shaft to release the rotation plate and the flange for relative rotation.

In some embodiments, the actuator of the rotation control assembly may be configured to provide controlled rotation to the rotation plate for transmission of controlled rotation to the primary shaft when selectively fixed for rotation with the rotation plate. In some embodiments, the lockout control system may include a display for indicating at least one of whether the two patient support top are connected with the end support and whether the rotation lockout assembly is in the unlocked state. In some embodiments, the display may include a user input for receiving a selection from a user to provide controlled rotation to the primary shaft.

In some embodiments, the rotation lockout assembly may include a safety latch assembly for blocking against inadvertent rotation of the rotation disk. The safety latch assembly may include a lock arm operable by an actuator between a latched position engaged with the rotation disk to block rotation and an unlatched position disengaged from the rotation disk to allow rotation of the rotation disk out of the locked position. In some embodiments, the safety latch assembly may include a trigger for deactivation to unlatch the lock arm to permit rotation of the rotation disk. In some embodiments, the trigger may include an arm having a contact end for operation by a user's hand and an indicator end for communicating with the actuator to operate the lock arm between the latched and unlatched positions.

In some embodiments, the lockout control system may be adapted to communicate with the rotation lock assembly to indicate whether the two patient support tops are connected with the end support. The actuator may arranged to maintain the lock arm in the latched position unless the lockout control system indicates that the two patient support tops are connected with the end support.

In some embodiments, the rotation lockout assembly may include a crank handle configured for operation by a user's hand. The crank handle may extend from the rotation disk to provide leverage in rotating the rotation disk between the locked and unlocked positions.

In some embodiments, the rotation lockout assembly may include a light indicator arranged proximate to the crank handle. The light indicator may be adapted to indicate whether the rotation disk is in the locked position by at least one of presence, absence, and color of light emitted and to indicate a position other than the locked position of the rotation disk by another one of presence, absence, and color of light emitted.

In some embodiments, the lockout control system may include a display for indicating at least one of whether the at least one patient support top is connected with the end support and whether the rotation lockout assembly is in the unlocked state. The display may include a user input for receiving a selection from a user to permit rotation of a rotation disk out of a locked position to permit free rotation of the at least one patient support top. In some embodiments, the user input may be a touch screen of the display and the user selection may operate an actuator to disengage a lock arm from the rotation disk to permit the rotation disk to move out of the locked position.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION

Figure 1:
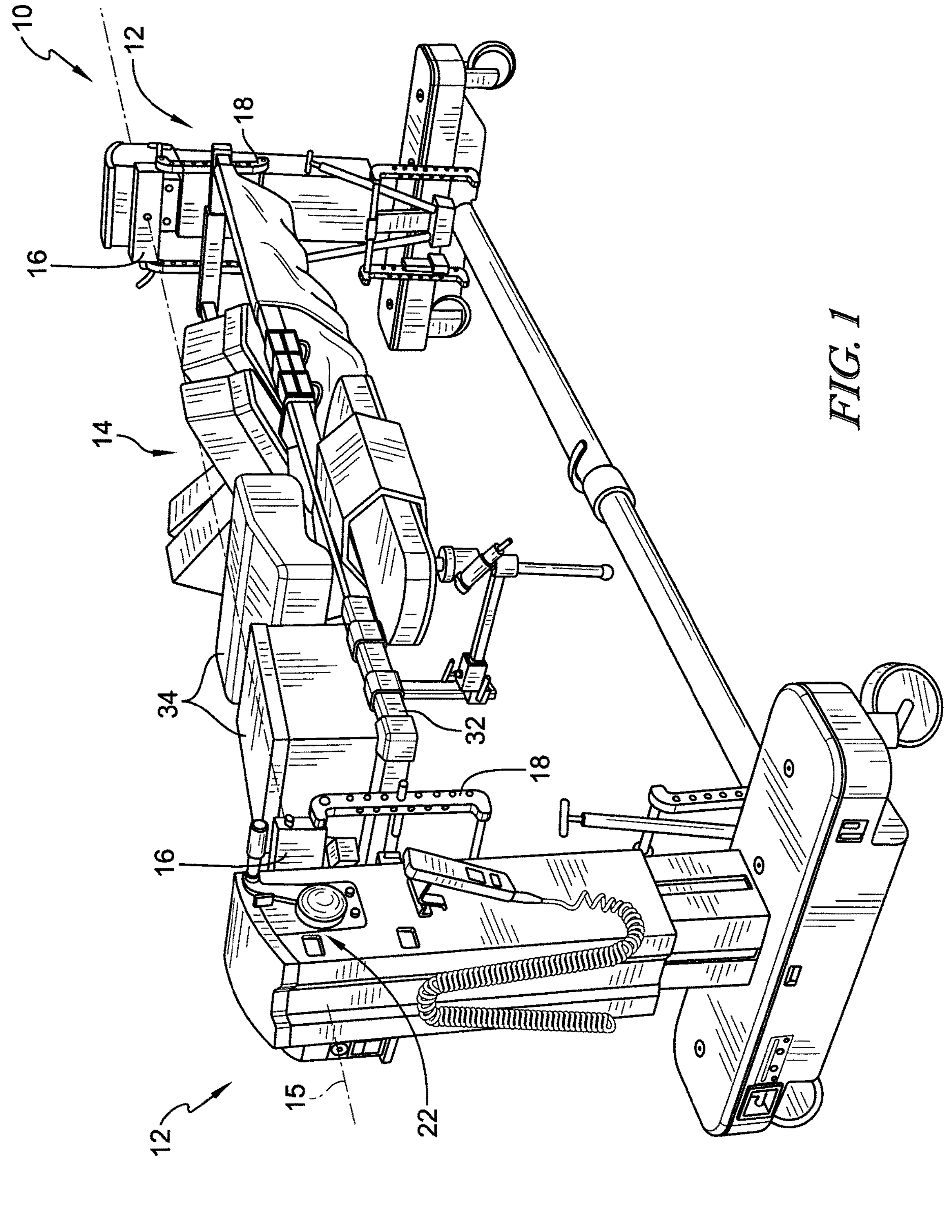
FIG. 1 is a perspective view of a patient support including a pair of end supports formed as tower bases supporting a support top above the floor for selective rotation about the long axis of the support top and showing that the patient support includes a rotation lockout assembly for selectively blocking rotation of the support top.

For the purposes of promoting an understanding of the principles of the disclosure, reference will now be made to a number of illustrative embodiments illustrated in the drawings and specific language will be used to describe the same.

In performance of various surgical procedures, providing surgical access to surgery sites on a patient's body can promote favorable surgical conditions and can increase the opportunity for successful results. Patient support devices can assist in positioning the patient's body to provide a surgical team preferred and/or appropriate access to particular surgical sites. Patient supports devices can include patient support tops which are supported above the floor by support structures. Such support structures can provide enhanced maneuverability to assist in positioning the patient's body by permitting selective movement of the patient support top.

In the illustrative embodiment as shown in FIG. 1, a patient support system 10 includes a pair of end supports, such as illustrative elevator tower bases 12, and a patient support top 14 connected at each longitudinal end with one of the tower bases 12. The tower bases 12 illustratively support the patient support top 14 above the floor and are embodied as elevator towers permitting selective operation to adjust the height of the patient support top 14 above the floor. As discussed in additional detail herein, the tower bases 12 illustratively support the patient support top 14 for selective rotation about an axis 15. Rotation of the patient support top 14 about axis 15 can assist in positioning the body of a patient supported on the top 14.

As shown in FIG. 1, the tower bases 12 each illustratively include a connection bar 16 connected with the support top 14 by a coupler assembly 18. Non-limiting examples of acceptable connection bars and coupler assemblies are disclosed in U.S. Patent Application Publication No. 2013/0269710 to Hight et al., the contents of which are hereby incorporated by reference in their entirety, and at least including the descriptions and figures related to yoke brackets and motion couplers and related features disclosed therein. In some embodiments, the patient support top 14 may be connected with the connection bar 16 in any suitable manner. In the illustrative embodiment, the connection bars 16 are illustratively rotatable about the axis 15 to provide rotation to the support top 14. Although generally shown as horizontal, the axis 15 may be selectively inclined by operation of the elevator towers to adjust the height of their respective connection with the patient support top 14. The patient support top 14 is illustratively embodied as an adaptable platform including a rail frame 32 having various support pads 34 secured thereto. The support top 14 is embodied as adapted for support of a patient in the prone position, including pads 34 arranged accordingly, but in some embodiments, may be adapted for support of a patient in any suitable position.

Figure 2:
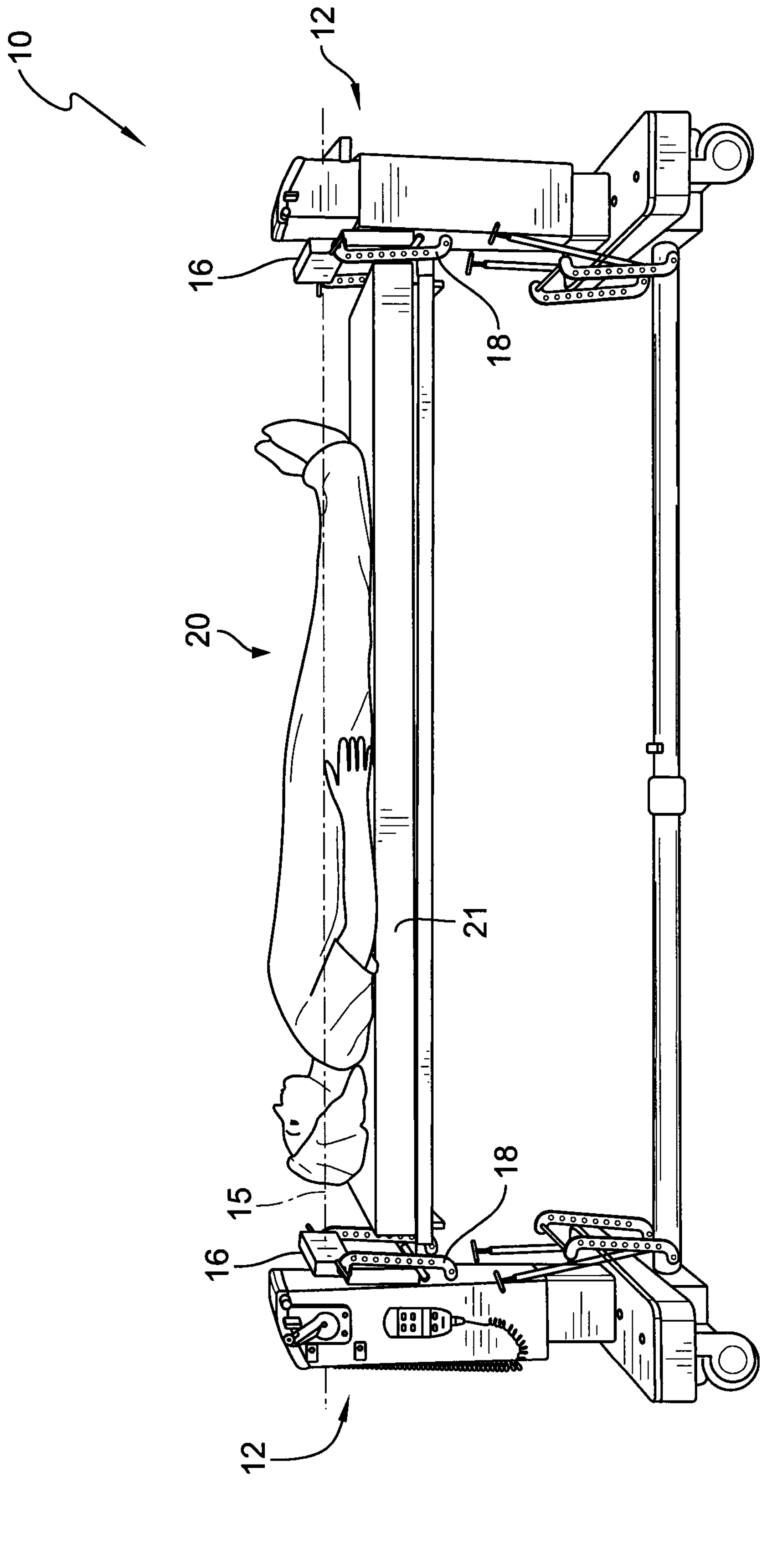
FIG. 2 is a side elevation view of the patient support of FIG. 1 showing the tower bases each connected with another type of support top by support brackets and showing that a patient is supported in the supine position on the support top.

As shown in FIG. 2, a patient is supported in a supine position on another patient support top 20 embodied to include a flat mattress top 21. The patient support top 20 is illustratively adapted for various patient body positions, including the supine position as shown in FIG. 2. The patient support top 20 illustratively connects with the connection bars 16 by the coupler assembly 18 in similar manner as patient support top 14 for selective rotation about axis 15.

Figure 3:
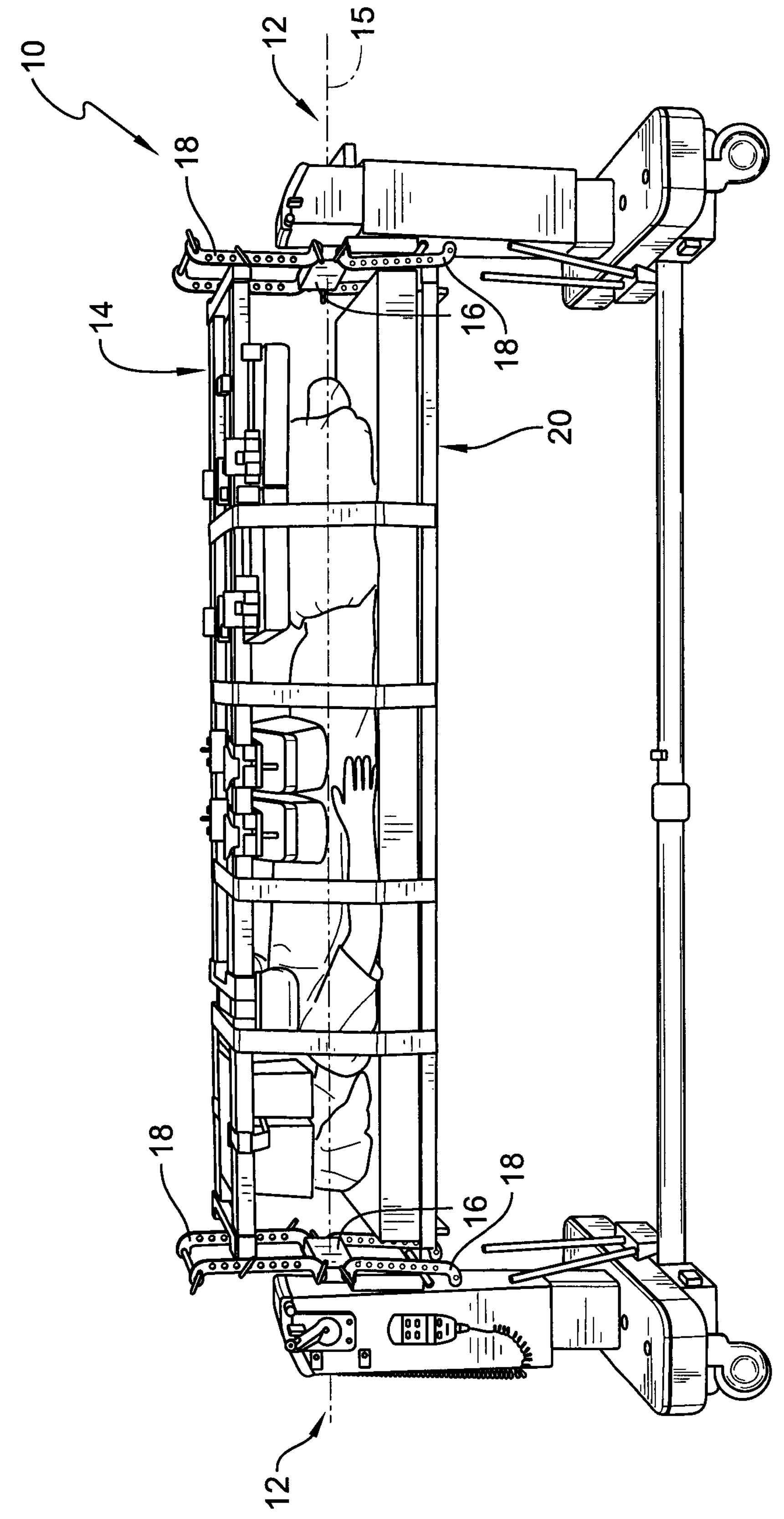
FIG. 3 is a side elevation view of the patient support of FIG. 2 showing that both types of support tops have been connected with the tower bases to prepared to rotate the patient between the supine and prone positions.

Referring to FIG. 3, the patient support top 14 is shown illustratively connected with the connection bars 16 simultaneously with the patient support top 20 to conduct a flip rotation of the patient. The patient support tops 14, 20 are illustratively arranged such that the support top 14 contacts one side of the patient's body (frontside) and the patient support top 20 contacts another side of the patient's body (backside). In the illustratively embodiment, the patient support tops 14, 20 are arranged about 180 degrees from each other about axis 15, but may be arranged in any suitable position according to the positioning required for the patient's body.

Figure 4:
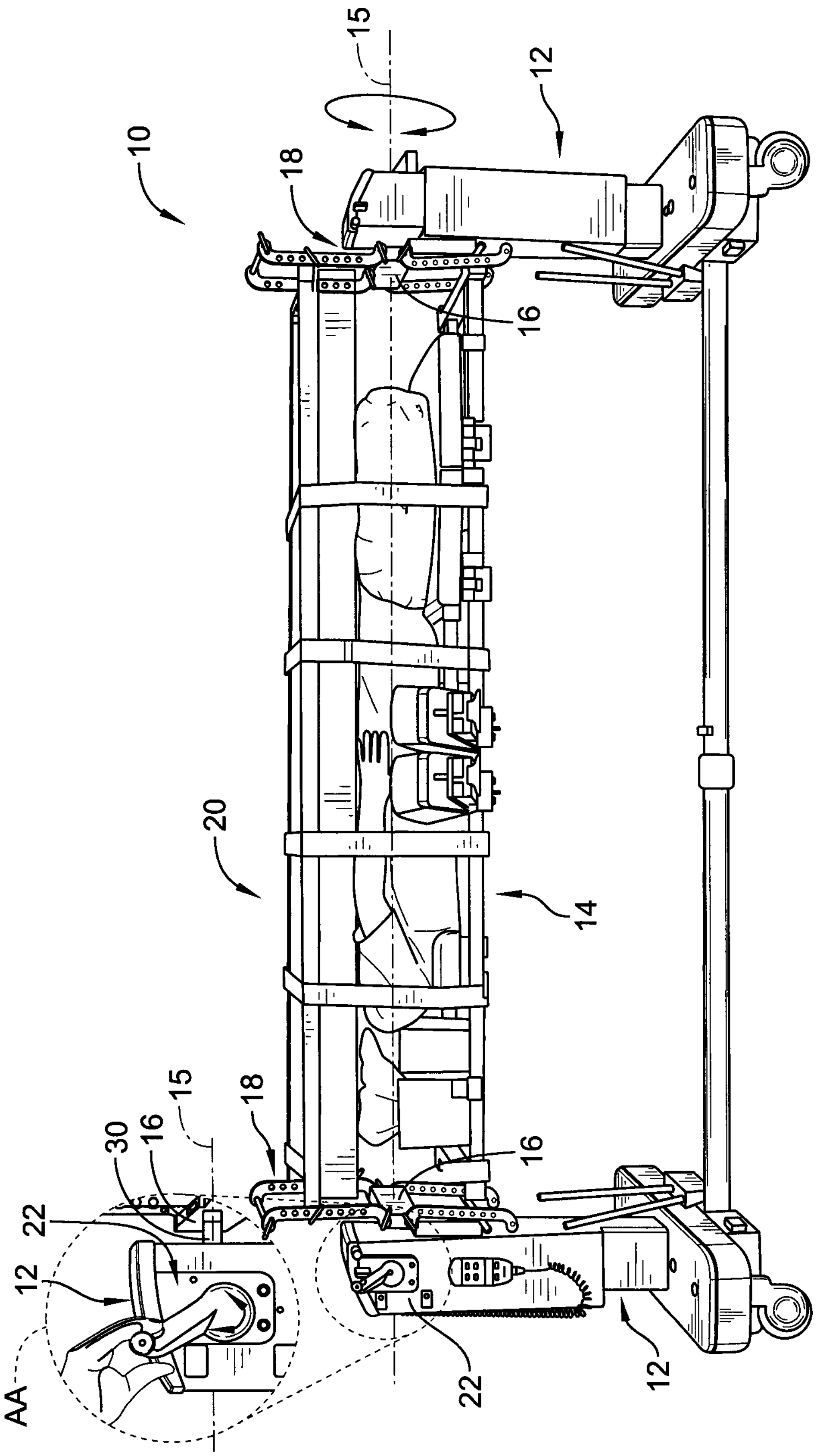
FIG. 4 is a side elevation view of the patient support of FIG. 3 showing that the support tops have been rotated to place the patient in the prone position.

Referring now to FIG. 4, the patient support tops 14, 20 have together been rotated by the connection bars 16 about axis 15 to place the patient in the prone position. Once in the prone position, the patient support top 20, now on top, can be removed for access to the patient's body in the prone position. As best shown in the magnification section AA of FIG. 4, a rotation lockout assembly 22 is illustratively mounted to one of the tower bases 12. The rotation lockout assembly 22 is illustratively operable between locked and unlocked states, as explained in additional detail herein, to selectively block against free rotation of the patient support tops 14, 20.

Figure 5:
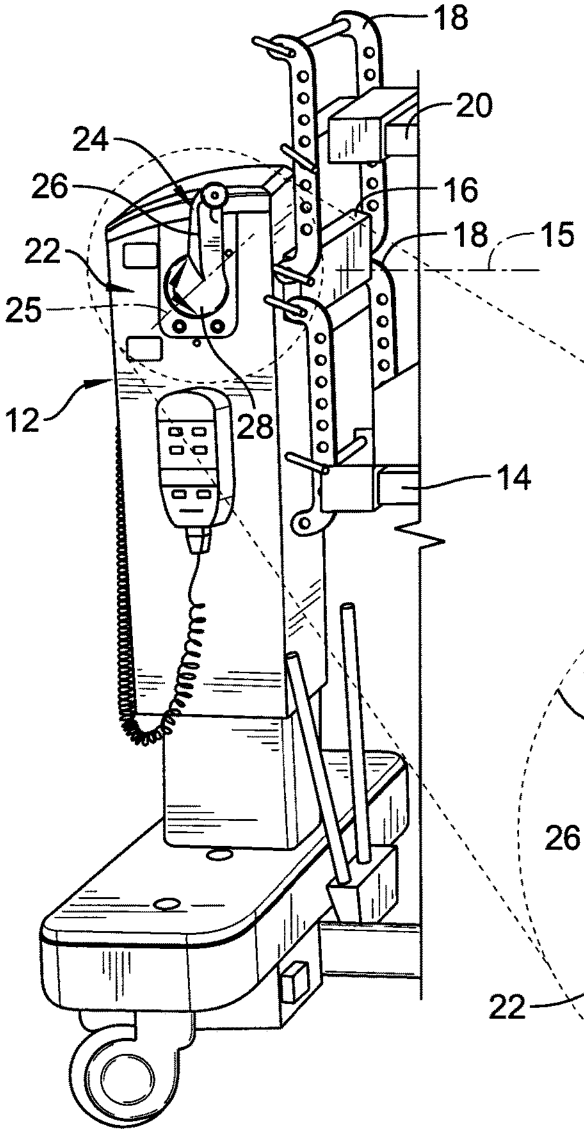
FIG. 5 is a side elevation view of one of the tower bases of the patient support of FIGS. 1-4 in isolation showing that the tower base includes the rotation lockout assembly for operating between locked and unlocked states to selectively block against free rotation of the support top.

As shown in FIG. 5, the rotation lockout assembly 22 illustratively includes a manual interface 24 for operation between the locked and unlocked states. In the illustrative embodiment, the manual interface 24 includes a crank handle 26 extending from a crank base 28 for engagement with a user's hand to receive rotational force (as suggested in FIG. 6). The crank handle 26 is illustratively mounted to extend from the lateral side of the tower base 12, but in some embodiments, may be arranged in any suitable position, including but without limitation, to extend from the front or top of the tower base 12 and anywhere along the height of the tower base 12. Rotational force applied to the handle 26 rotates the base 28 about an axis 25 to selectively release the connection bar 16 for rotation about axis 15.

Figure 6:
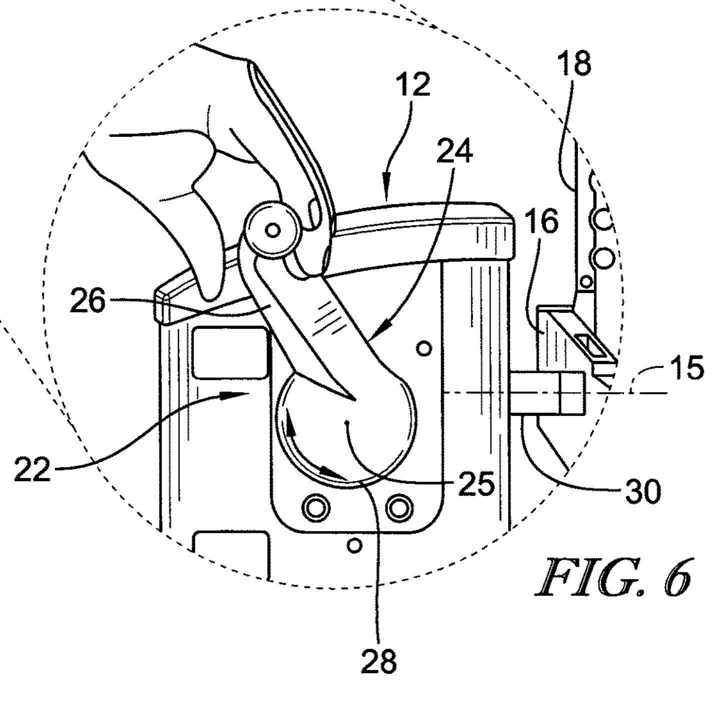
FIG. 6 is closer view of a portion of the tower base of FIG. 5 showing that the lockout assembly includes a crank handle for operating the lockout assembly.

As best shown in FIG. 6, the connection bar 16 is illustratively connected with the tower bases 12 by a shaft 30 that is arranged for selective rotation upon unlocking of the rotation lockout assembly 22, as discussed in additional detail herein. The rotation lockout assembly 22 illustratively blocks the shaft 30 against free rotation about the axis 15 while in the locked state, and permits free rotation of the shaft 30, and thus, free rotation of any attached patient support tops 14, 20 that are secured with the shaft 30 via the connection bar 16 and coupler assembly 18, while in the unlocked state. In the illustrative embodiment, free rotation of the shaft 30 is achieved by manual rotation of the attached patient support tops 14, 20 that are connected with the connection bars 16, but in some embodiments, free rotation may be achieved with any of partial or full actuator assistance.

Figure 8:
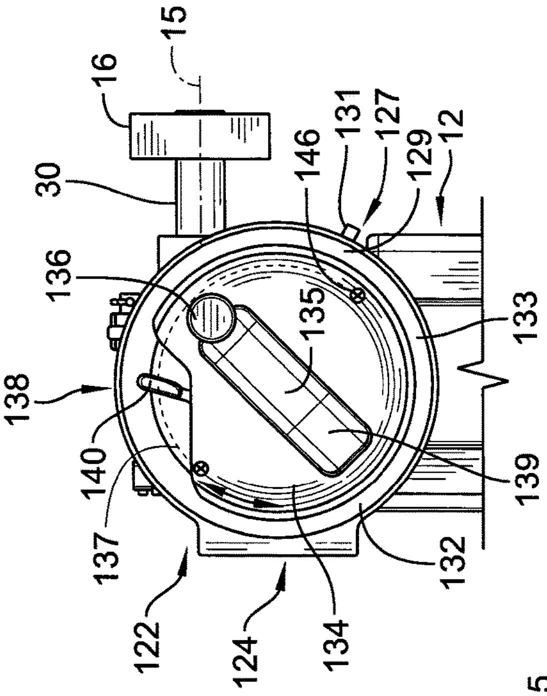
FIG. 8 is a side elevation view of the tower base of FIG. 7 showing that the safety latch assembly includes a trigger for selectively releasing the rotation disk for manual rotation and showing that the tower base includes a shaft extending therefrom to support the patient tops for selective rotation.
Figure 7:
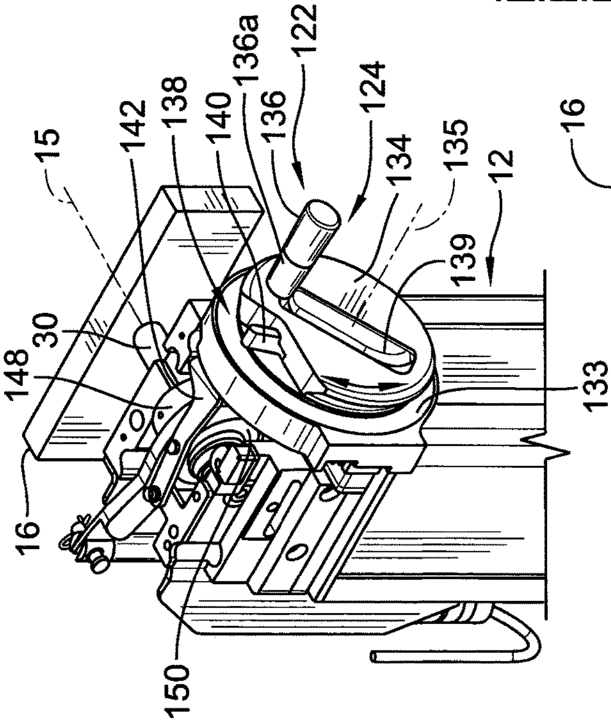
FIG. 7 is a perspective view the tower base of FIGS. 5 and 6 having an outer portion removed to show another illustrative embodiment of a rotation lockout assembly is in the locked state and includes a rotation disk which can operate between the locked and unlocked positions by manual rotation of the crank handle, and a lever arm connected off-center to an opposite side of the rotation disk from the crank handle for traversing an arced path with rotation of the rotation disk.
Figure 9:
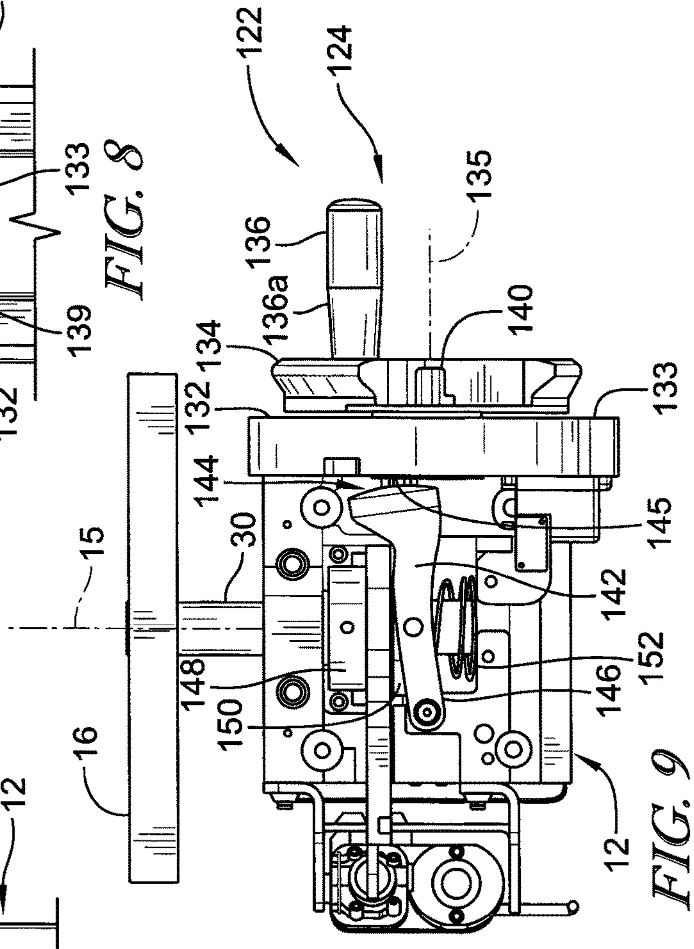
FIG. 9 is a top plan view of the tower base of FIGS. 6 and 7 showing that the lever arm is secured with a locking collar that is slidingly disposed on the shaft, and showing the shaft includes a flange fixed against rotation relative to the shaft and a rotation plate selectively fixed for rotation with the flange by selective operation of pins of the locking collar to engage each of the rotation plate and the flange to block free rotation of the shaft.
Figure 17:
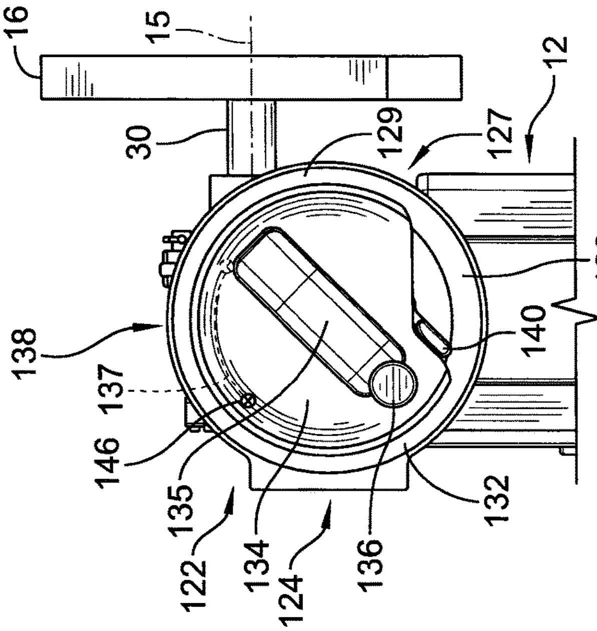
FIG. 17 is a side elevation view the tower base of FIGS. 8, 11, and 14 showing that the rotation disk is in the unlocked position and showing that the lever arm has traversed another portion of its arced path.
Figure 18:
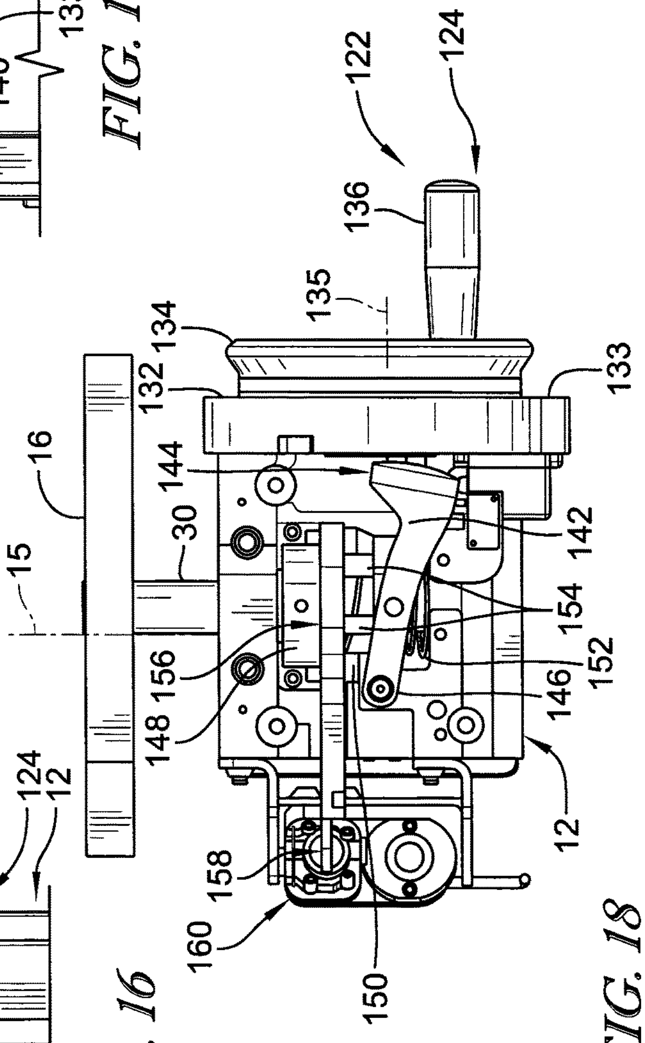
FIG. 18 is a top plan view the tower base of FIGS. 9, 12, and 15 showing that the rotation disk is in the unlocked position and showing that lever arm has traversed its arced path to fully retract the locking collar and the pins from engagement with the flange to permit free rotation of the shaft and support top.
Figure 16:
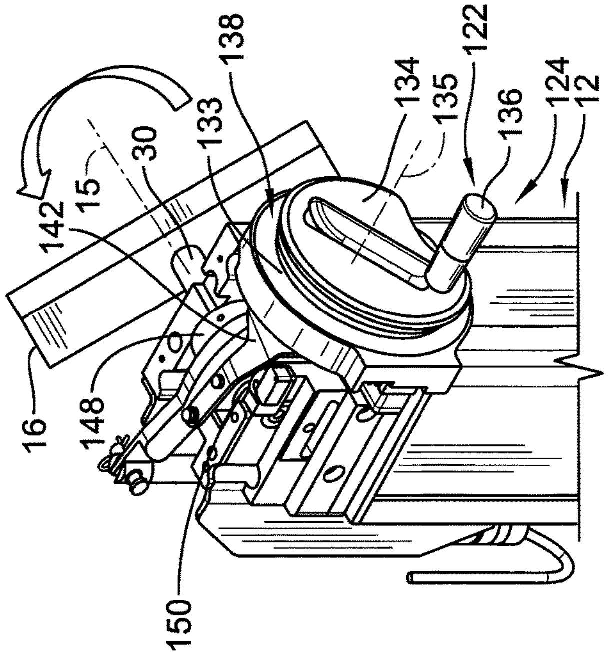
FIG. 16 is a perspective view the tower base of FIGS. 7, 10, and 13 showing that the rotation disk has been rotated counter-clockwise to the unlocked position.

As shown in FIG. 7, another illustrative embodiment of a rotation lockout assembly 122 is shown mounted to the tower base 12 with an outer covering removed for ease of description. The rotation lockout assembly 122 illustratively includes a disk 132 operable for rotation between locked (as shown in FIGS. 7-9) and unlocked (as shown in FIGS. 16-18) positions to respectively realize the locked (as shown in FIGS. 7-9) and unlocked (as shown in FIGS. 16-18) states of the rotation lockout assembly 122. The disk 132 illustratively includes a light device 133 indicating the locked position by a first color and any position other than the locked position by a second color for ease of indication to the user. The light device 133 is embodied as a 2-color (green-red) annular LED strip extending along the circumferential exterior surface of the disk 132, but in some embodiments may have on-off light indication. The light device 133 illustratively extends substantially entirely about the visually exposed exterior surface of the disk 132 to create a surrounding glow when activated to provide a distinct and highly observable visual signal of the status of the rotational lockout assembly 122.

The disk 132 is illustratively secured with and receives rotational force from a manual interface 124. The manual interface 124 is illustratively embodied to include a base 134 formed as a disk connected concentrically with the rotation disk 132 and a grip 136 illustratively extending from the base 134 for engagement with a user's hand to apply rotational force to the base 134. The base 134 is selectively rotatable under the force from the grip 136 to rotate the disk 132 about an axis 135.

The grip 136 is illustratively formed ergonomically for grasping, embodied as a generally cylindrical extension having a tapered portion 136*a* proximate to the connection with the base 134. The grip 136 is illustratively arranged as a foldable grip having a hinged connection with the base 134 to fold from a perpendicular position relative to the base 134 (as shown in FIGS. 7-9) to a collapsed position for reception within a depression 139 formed in the base 134 for storage. The light device 133 is illustratively arranged proximate the manual interface 124 to provide high visibility at the point of user interface with the rotation lockout assembly 122 to assist in reducing the risk of mistaken unlocking of the rotation lockout assembly 122. In some embodiments, the light device 133 may be arranged on any of the base 134, grip 136, and/or with any other suitable arrangement for notification.

Figure 11:
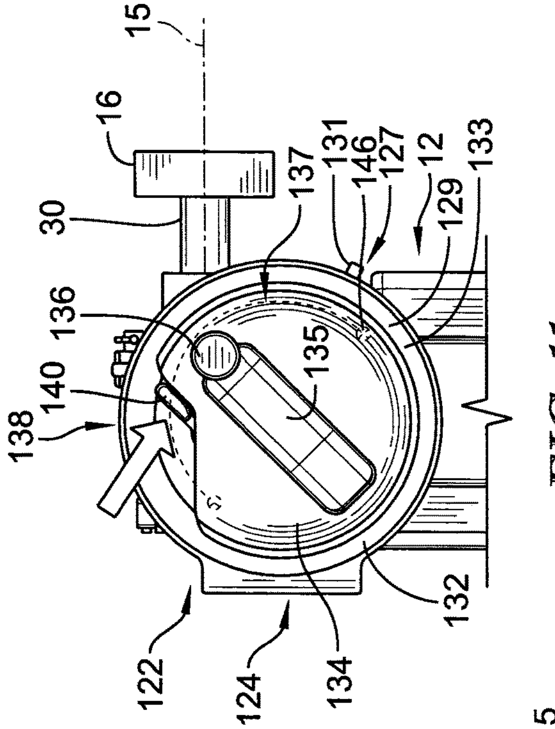
FIG. 11 is a side elevation view the tower base of FIG. 8 showing that the lever arm traverses an arced path (dashed line) under rotation of the rotation disk.

Referring to FIG. 8, a safety latch assembly 138 is operable to prevent inadvertent rotation of the disk 132. The safety latch assembly 138 illustratively includes a trigger 140 positionable between an engaged position (as shown in FIG. 8) to block rotation of the disk 132 from the locked position and a disengaged (depressed) position (as shown in FIG. 11) to permit rotation of the disk 132 between the locked and unlocked positions. As explained in additional detail herein, the trigger 140 is embodied as a lever arranged for ergonomic actuation by a user's thumb while grasping the grip 136.

Referring to the illustrative embodiment as shown in FIG. 9, a lever arm 142 is pivotably secured for three degrees-of-freedom at one end 144 with the disk 132 and for three degrees-of-freedom at another end 146 to the tower base 12. At end 144, the lever arm 142 is pivotally connected with the disk 132 for three degrees-of-freedom by a spherical joint 145 and pivotally connected at the other end 146 with the tower base 12 by a loosely pinned connection permitting limited translation along the pin. The end 144 of the lever arm 142 is illustratively connected with the disk 132 offset from center of rotation (i.e., not coincident to axis 135).

Figure 14:
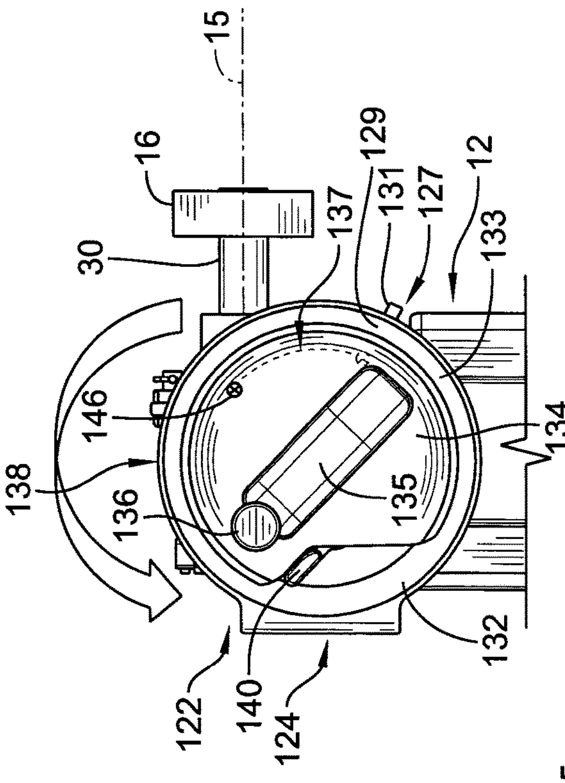
FIG. 14 is a side elevation view the tower base of FIGS. 8 and 11 showing that the rotation disk is in the intermediate position between the locked and unlocked positions and showing that the lever arm has traversed a portion of its arc path.

The offset connection of the end 144 of the lever arm 142 with the disk 132 traverses the lever arm 142 along an arced path 137 as the disk 132 rotates about the axis 135 as suggested in FIGS. 8, 14, and 17. The loosely pinned connection of the end 146 with the tower base 12 allows permits some relative vertical movement between the lever arm 142 and the tower base 12 (in and out the page in the orientation as shown in FIG. 9) which accommodates articulation of the lever arm 142 to follow the arced path 137 at the end 144. The lever arm 142 transfers rotational movement of the disk 132 to provide selective unlocking of the shaft 30 for free rotation.

As shown in FIG. 9, the shaft 30 illustratively includes a flange 148 extending radially therefrom and fixed against rotation relative to the shaft 30. The lever arm 142 illustratively includes a locking collar 150 (also shown in FIG. 7). The collar 150 is illustratively pivotally secured with the lever arm 142 with loosely pinned connection (e.g., allowing limited vertical movement, in and out the page in the orientation as shown in FIG. 9) to transfer the movement of the lever arm 142 along the arced path 137 into linear movement of the collar 150 along the axis 15 without binding.

In the illustrative embodiment, the collar 150 is slidingly and rotatably mounted on the shaft 30 for selective engagement with the flange 148 according to the position of the lever arm 142. As the lever arm 142 traverses its arced path by rotation of the disk 132, the lever arm 142 drives the collar 150 to slide along the shaft 30 for selective engagement with the flange 148. As shown in FIG. 9, a resilient member 152, embodied as a spring, is arranged to bias the collar 150 for engagement with the flange 148, thus, biasing the rotation disk 132 towards the locked position.

Figure 12:
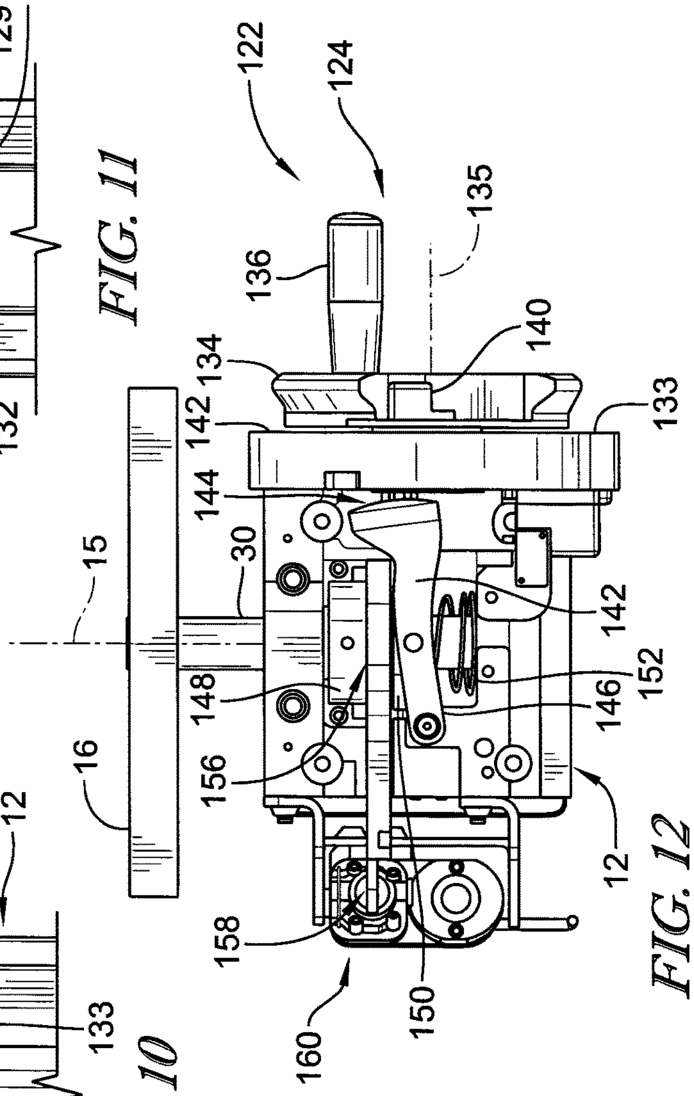
FIG. 12 is a top plan view the tower base of FIG. 9 showing that the locking collar is engaged with the flange to maintain the lockout assembly in the locked state.
Figure 10:
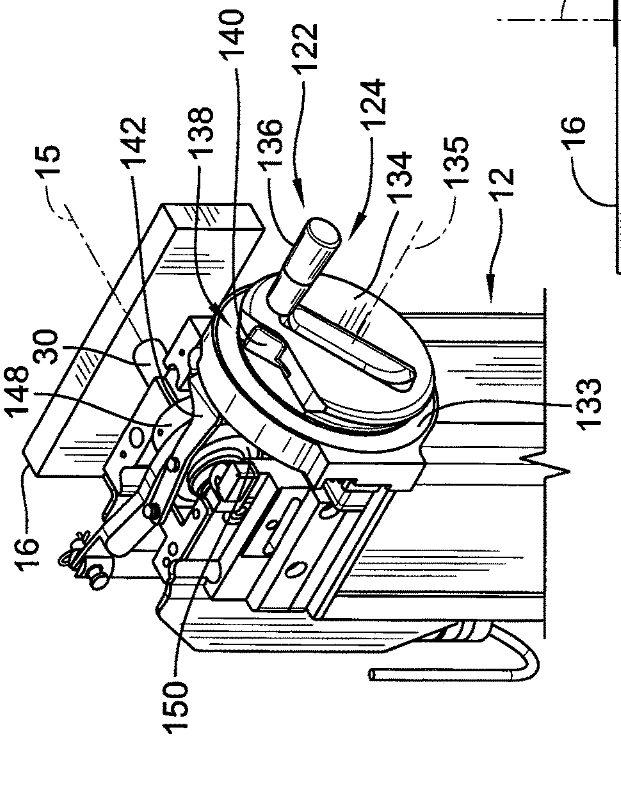
FIG. 10 is a perspective view the tower base of FIG. 7 showing that the trigger is depressed to deactivate the safety latch assembly while the lockout assembly remains in the locked state.
Figure 15:
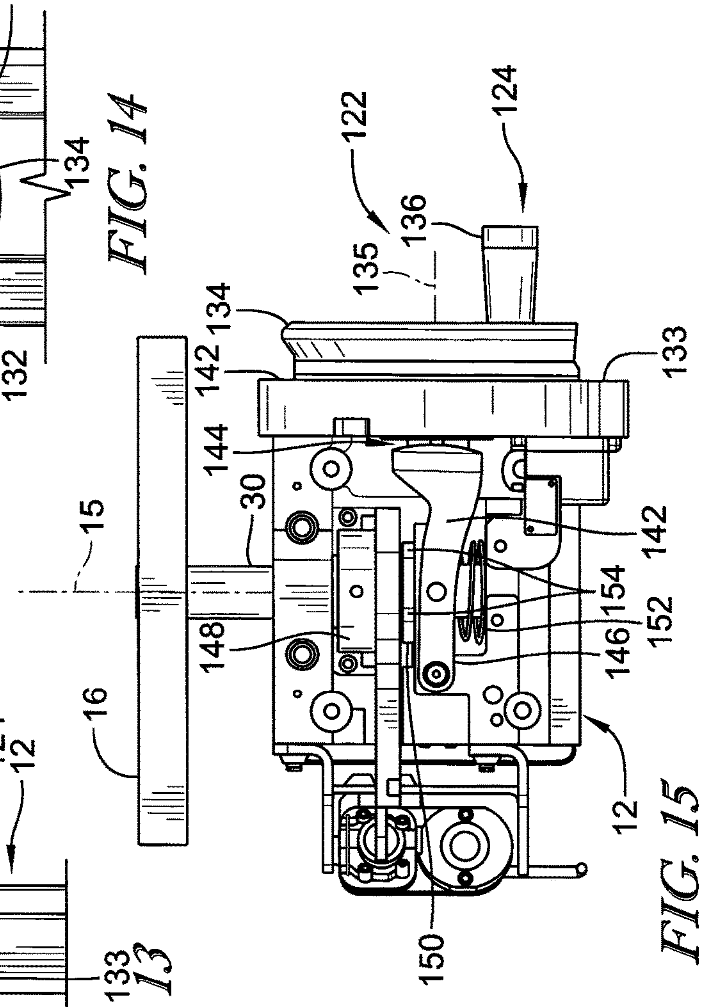
FIG. 15 is a top plan view the tower base of FIGS. 9 and 12 showing that the rotation disk is in the intermediate position between the locked and unlocked positions and showing that lever arm has traversed a portion of its arced path to partially retract the locking collar from engagement with the rotation collar, and showing that the locking collar includes the pins extending therefrom for selectively insertion within holes of both the rotation plate and the flange to prevent relative rotation of the rotation plate and the flange.
Figure 13:
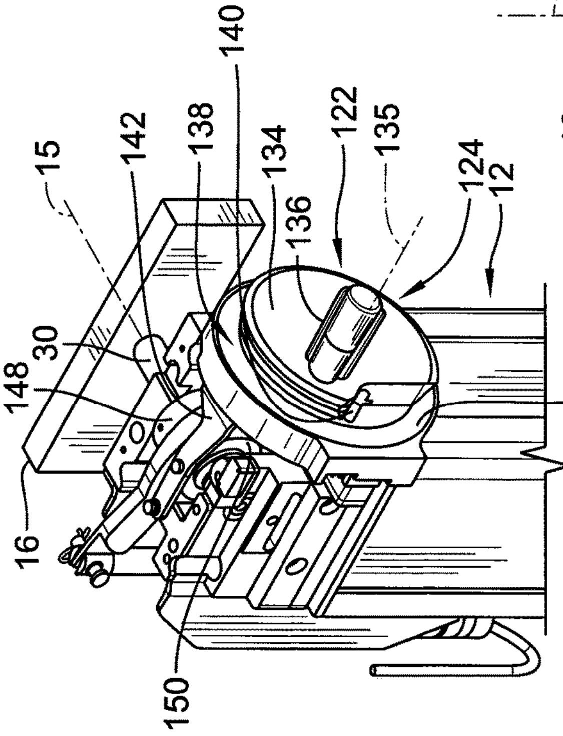
FIG. 13 is a perspective view the tower base of FIGS. 7 and 10 showing that the rotation disk has been rotated counter-clockwise to an intermediate position between the locked and unlocked positions of the rotation disk.

Referring to FIGS. 10-12, 13-15, and 16-18 in turn, operation of the rotation lockout assembly 122 is shown according to the locked state (as shown in FIGS. 10-12), an intermediate state between the locked and unlocked states (as shown in FIG. 13-15, and the locked state (as shown in FIGS. 16-18). Referring to FIGS. 10-12, the rotation lockout assembly 122 is illustratively shown in the locked state, but the trigger 140 has been actuated into its disengaged (depressed) position to release the disk 132 for rotation. The disk 132 illustratively remains in its locked position until rotated therefrom. As shown in FIG. 11, the arced path 137 is illustratively indicated according to the end 146 of the lever arm 142 shown through the base 134 for descriptive purposes.

Referring to FIGS. 13-15, the rotation lockout assembly 122 is illustratively shown in the intermediate state. In the intermediate state, the disk 132 has illustratively been rotated into an intermediate position driving the end 146 of the lever arm 142 partially along its arced path 137. Referring to FIG. 15, the lever arm 142 is shown pivoted slightly about its end 146 due to the partial traversal of the end 144 along its arced path 137 such that the collar 150 has slid away (downward in the orientation as shown in FIG. 15) to partially extract the pins 154 from engagement with the flange 148.

Referring now to FIGS. 16-18, the rotation lockout assembly 122 is illustratively shown in the unlocked state. In the unlocked state, the disk 132 has illustratively been rotated into the unlocked position driving the end 146 of the lever arm 142 to a limit of its arced path 137. Referring to FIG. 18, the lever arm 142 is shown pivoted about its end 146 due to the traversal of the end 144 along its arced path 137 such that the collar 150 has slid away (downward in the orientation as shown in FIG. 15) to completely withdraw the pins 154 from engagement with the flange 148. Although the pins 154 illustratively remain engaged with the plate 149, the pins 154 are no longer engaged with the flange 148 (and thus the shaft 30) such that the shaft 30 may rotate freely. Free rotation of the shaft 30 can permit a user to rotate any patient support tops 14, 20 secured with the shaft 30 about the axis 15. Once the patient support tops 14, 20 are arranged as desired, the rotation lockout assembly 122 is returned to the locked position re-engaging the collar 150 with the flange 148 to block against free rotation of the patient support tops 14, 20.

Figure 19:
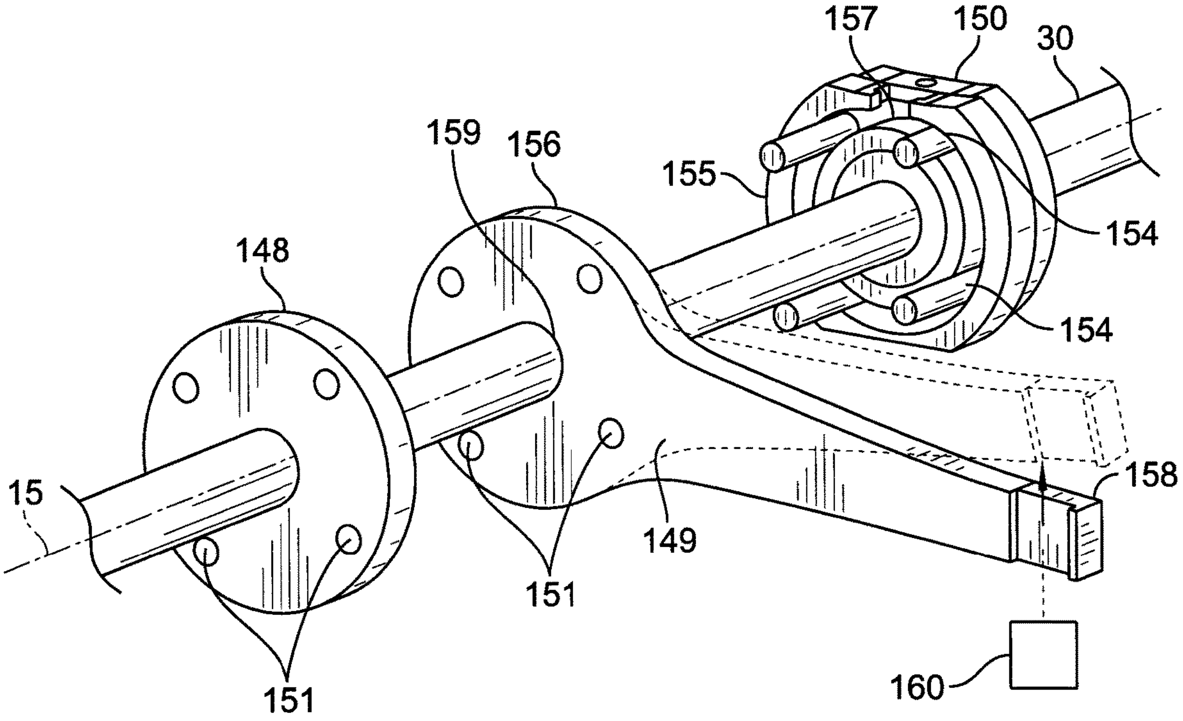
FIG. 19 is a perspective exploded view of a portion of the rotation lock assembly include the shaft, flange, rotation plate, and locking collar to illustrate their interaction and the articulation of the rotation plate (dashed lines) for controlled rotation of the shaft, and showing that the pins are seated within a track of the locking collar.

Turning to FIG. 19, an exploded view is shown of a portion of the shaft 30 including its flange 148 secured thereto, the plate 149 rotatably mounted on the shaft 30, and the collar 150 sliding and rotatably mounted on the shaft 30. The collar 150 illustratively includes a body 155 defining a track 157 therein. In the illustrative embodiment, the pins 154 are slidingly seated within the track 157 and project axially from the body 155 for engagement with the plate 149 and selective engagement with the flange 148 according to the position of the collar 150.

As shown in FIG. 19, the flange 148 and plate 149 each illustratively include pin holes 151 spaced apart from each other evenly in the axial and circumferential directions and each adapted to receive the pins 154 therein. In the illustrative embodiment, the pins 154 remain inserted (at least partially) within the hole 151 of the plate 149, but selectively engage the holes 151 of the flange 148. Selective insertion of the pins 154 into the flange 148 provides selective securing of the flange 148 with the plate 149 to block relative rotation between the flange 148 and plate 149. When the collar 150 is engaged with the flange 148, the pins 154 extend through the plate 149 and into the flange 148 such that the plate 149 is fixed against rotation relative to the flange 148 (for example, as shown in FIG. 12). Extracting the pins 154 from engagement with the flange 148 permits relative rotation between the flange 148 and plate 149. As explain in additional detail below, the plate 149 ordinarily remains stationary relative to the axis 15, but can be operated for controlled rotation to provide fine angular adjustment to the shaft 30.

In the illustrative embodiment, the flange 148 can selectively engage with the collar 150 in four angular positions to fix the rotational position of the shaft 30 about the axis 15. As mentioned above, the position of the shaft 30 (and thus the flange 148) under free rotation is illustratively directed by the position of any attached patient support tops 14, 20 according to the desired position of the patient's body. The flange 148 illustratively includes four holes 151 arranged corresponding to the positions the holes 151 of the plate 149 (and thus the pins 154) such that coincident positioning of any hole 151 of the flange 148 with any hole 151 of the plate 149 provides coincident positions of the remaining holes 151 of the flange 148 and plate 149 to receive the pins 154. The four angular positions of the flange 148 are defined by the coincident positioning of one hole 151 of the flange 148 with each hole 151 of the plate 149 to receive a corresponding pin 154 through the plate 149 to block relative rotation between the flange 148 and plate 149 in any of four locked angular arrangements.

In the illustrative embodiment, the four locked angular arrangements of the patient support tops 14, 20 about the axis 15, are defined at 90 degree intervals including those arrangements shown in FIGS. 1-4 providing prone and supine positions of the patient's body. In some embodiments, any suitable number of locked angular arrangements may be applied, including by application of any suitable number and/or arrangement of holes 151 and pins 154 for various discrete angular positions, including uneven spacing of holes 151 and/or pins 154 to deny locking at certain angular positions.

As indicated in FIG. 19, although the pins 154 are slidingly received within the track 157 to permit their movement along the track 157 relative to the body 155, the pins 154 remain engaged within corresponding holes 151 of the plate 149 during operation of the rotation lockout assembly 122 to maintain the position of pins 154 relative to each other. The sliding movement of the pins 154 along the track 157 permits controlled rotation of the shaft 30 under drive from the plate 149. In the illustrative embodiment, free rotation can include rotation relative to the plate 149. Controlled rotation can include discrete rotation under force of an actuator which prevents rotation while the actuator is stationary; while free rotation can include safe rotation, under control, but without affirmative lockout, and with or without discrete restriction.

In the illustrative embodiment as shown in FIG. 19, the plate 149 is rotatably mounted at one end 156 on the shaft 30 by receiving the shaft 30 through a hole 159. On another end 158, the plate 149 is illustratively pinned to an actuator 160 arranged to provide controlled pivoting of the plate 149 about the shaft 30 as part of a rotation control assembly which can include any of the flange 148, plate 149, collar 150, and actuator 160. When the rotation lockout assembly 122 is in the locked state such that the collar 150 is engaged with the flange 148, the actuator 160 can selectively provide controlled rotation of the shaft 30 through articulation of the plate 149. The actuator 160 is illustratively embodied as a linear actuator providing a range of pivoting motion to the plate 149 by operation between retracted and extended positions to articulate the end 158 of the plate 149. In some embodiments, any suitable type and/or arrangement of controlled rotation actuation may be used.

The controlled rotation provided by the rotation control assembly provides fine rotation control for positioning the patient support tops and the patient's body. In the illustrative embodiment, the controlled rotation of the shaft 30 provided by the actuator 160 can be selected by the user within a range of about −30 degrees to about +30 degrees, but in some embodiments, may include a range of about −180 degrees to about +180 degrees.

Figure 20:
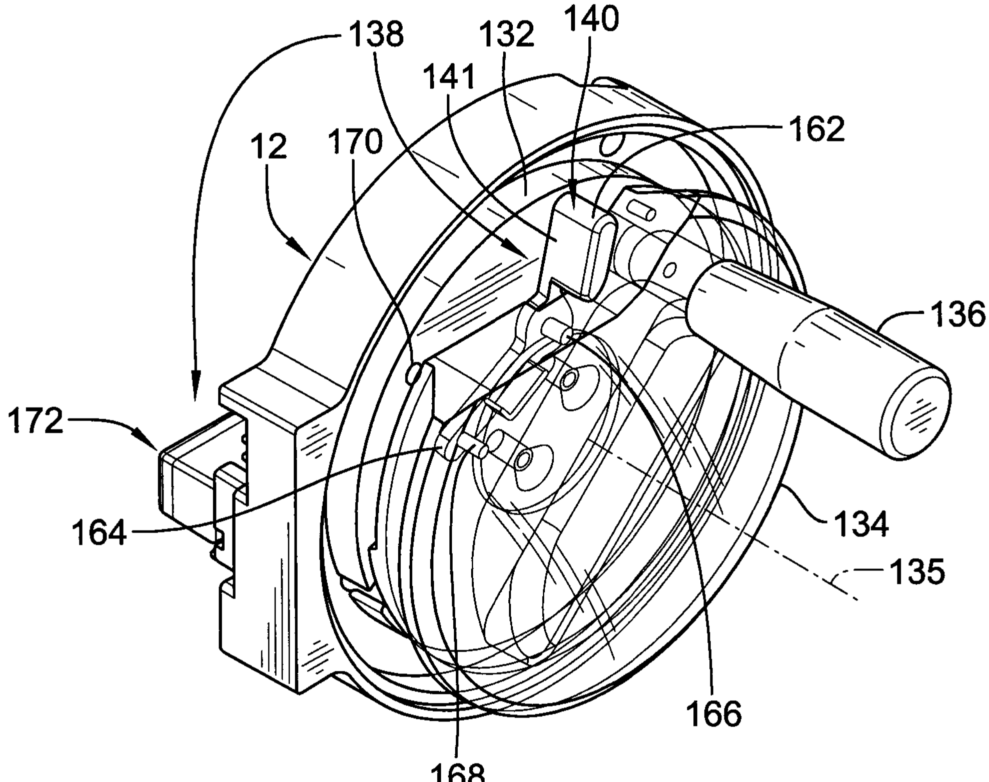
FIG. 20 is a perspective view of a portion of the rotation lockout assembly having a base of the crank handle rendered transparent to reveal details of the safety latch assembly.

As shown in the illustrative embodiment of FIG. 20, the rotation disk 132 is shown with portions of the tower base 12 omitted and with the base 134 transparent to reveal certain details of the safety latch assembly 138 for descriptive purposes. As previously mentioned, the trigger 140 is illustratively embodied as a lever, embodied a bent lever. The trigger 140 illustratively includes an ergonomic engagement end 162 and a switch end 164 opposite the engagement end 162. The trigger 140 illustratively includes a pivot 166 formed as an extension projecting parallel to the axis 135 and engaged with the disk 132 (and/or with the base 134 in some embodiments) and traveling therewith about the axis 135 under rotation of the disk 132. The trigger 140 is illustratively arranged to permit the ends 162, 164 to pivot (seesaw) about the pivot 166 under operation by a user between the engaged and disengaged positions. A resilient member, such as a spring, may be used to bias the trigger 140 into the engaged position (as shown in FIG. 21).

Figure 21:
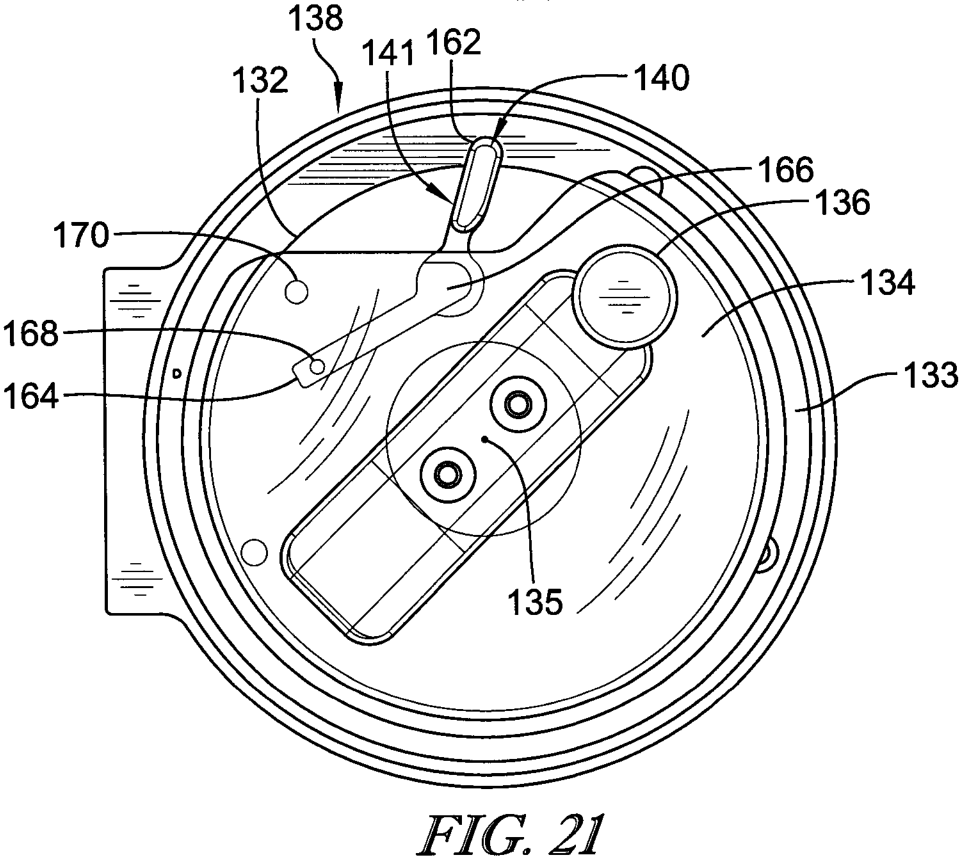
FIG. 21 is a side elevation view of the portion of the rotation lockout assembly of FIG. 20 having the base of the crank handle rendered transparent to reveal details of the safety latch assembly and showing that the trigger is in an engaged position.
Figure 22:
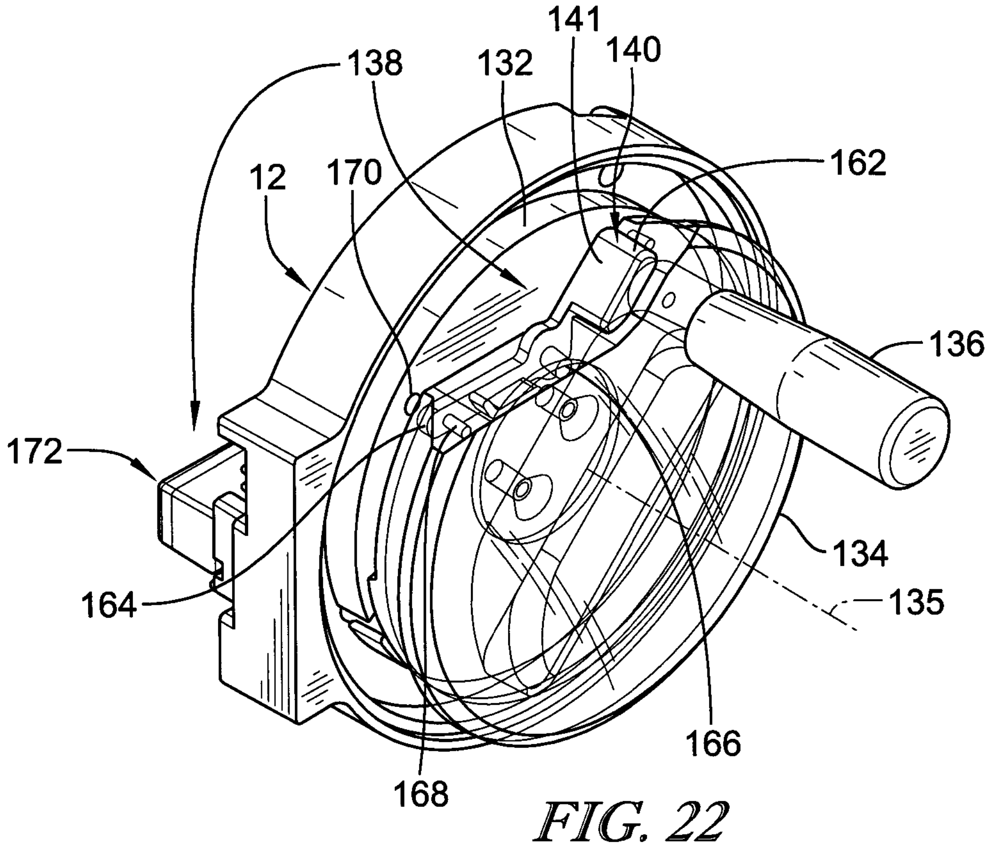
FIG. 22 is a perspective view of the portion of the rotation lockout assembly of FIGS. 20 and 21 showing that the trigger has been depressed into the disengaged position.
Figure 23:
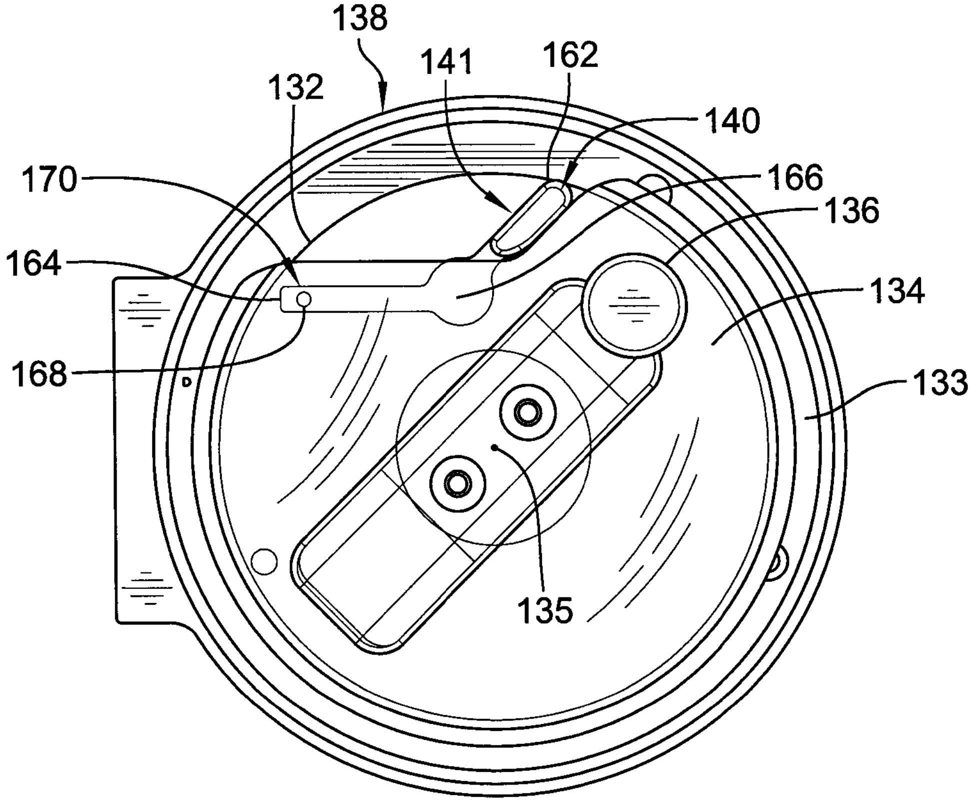
FIG. 23 is a side elevation view of the portion of the rotation lockout assembly of FIGS. 21-23 showing that the trigger includes an indicator that has been articulated into corresponding position with a sensor to indicate the disengaged position of the trigger.

As shown in FIG. 21, the trigger 140 illustratively includes an indicator 168 arranged to indicate the position of the trigger 140. The indicator 168 is illustratively arranged at the switch end 164 for communication with a sensor 170 that is mounted in the disk 132. When the trigger 140 is arranged in the engaged position (blocking rotation of the disk 132) the indicator 168 is pivoted out of correspondence with the position of the sensor 170 such that it can be determined that the trigger 140 is in the engaged position and that the disk 132 is blocked against rotation out of the locked position. As shown in FIGS. 22 and 23, when the trigger 140 is pivoted into the disengaged position (to release rotation of the disk 132) the indicator 168 is arranged in correspondence with the position of the sensor 170 such that it can be determined that the trigger 140 is in the disengaged position and that the disk 132 is not blocked against rotation out of the locked position.

In the illustrative embodiment, the indicator 168 is a magnet and the sensor 170 is a reed switch in communication with an actuator 172 for selectively blocking rotation of the disk 132. In some embodiments, the indicator 168 and sensor 170 may be any suitable combination of communicating features having any suitable arrangement to indicate the position of the trigger 140. As shown in FIG. 23, the engagement end 162 of the trigger 140 illustratively forms a contact pad 141 projecting along the axis 135 for ergonomic engagement with a user's thumb while grasping the grip 136. The contact pad 141 illustratively contacts a surface of the base 134 when the trigger 140 is arranged in the disengaged position to provide an end stop.

Figure 24A:
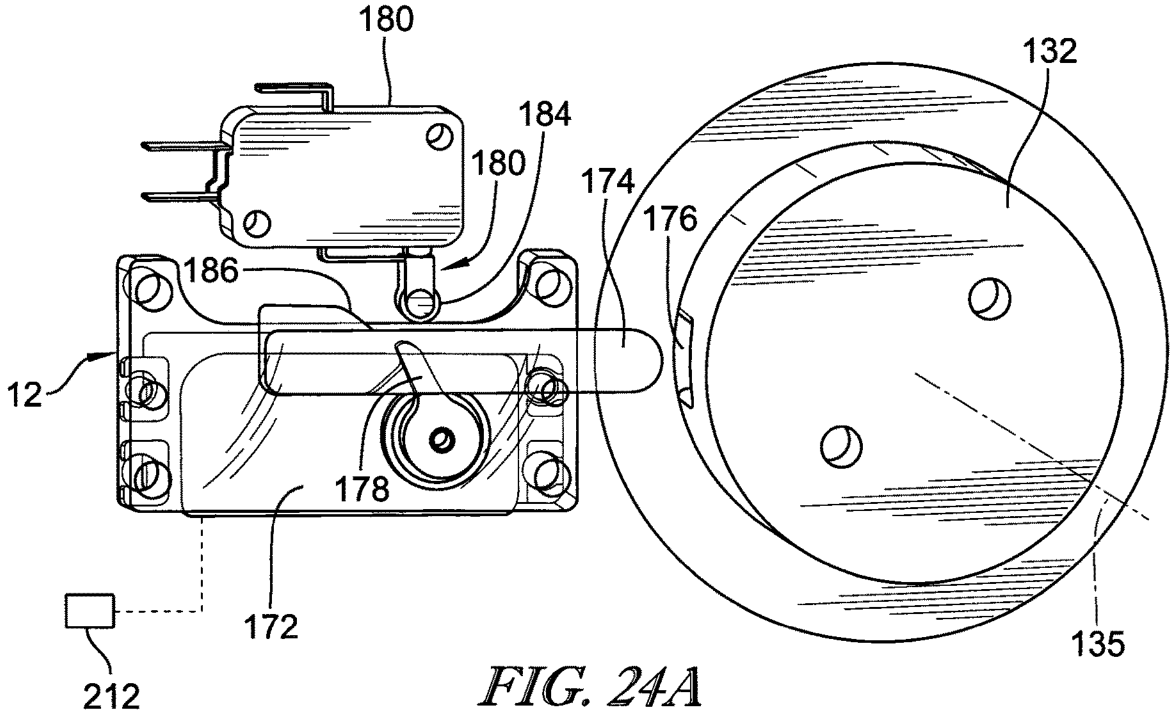
FIG. 24A is a diagrammatic side elevation view of a portion of the rotation lockout assembly from an inner side of the rotation disk showing that a lockout key is arranged in a disengaged position in which it is not inserted within a key hole of the rotation disk.
Figure 24B:
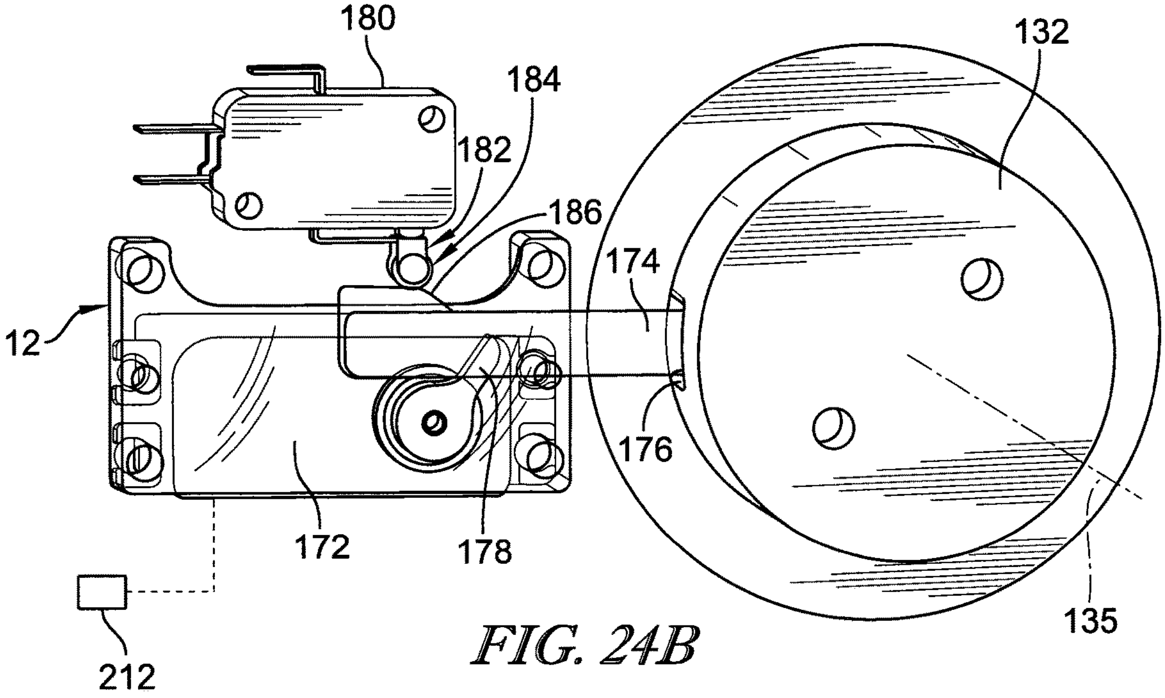
FIG. 24B is the diagrammatic side elevation view of a portion of the rotation lockout assembly of FIG. 24 having the key arranged in an engaged position inserted into the key hole of the rotation disk to block rotation of the rotation disk.
Figure 25:
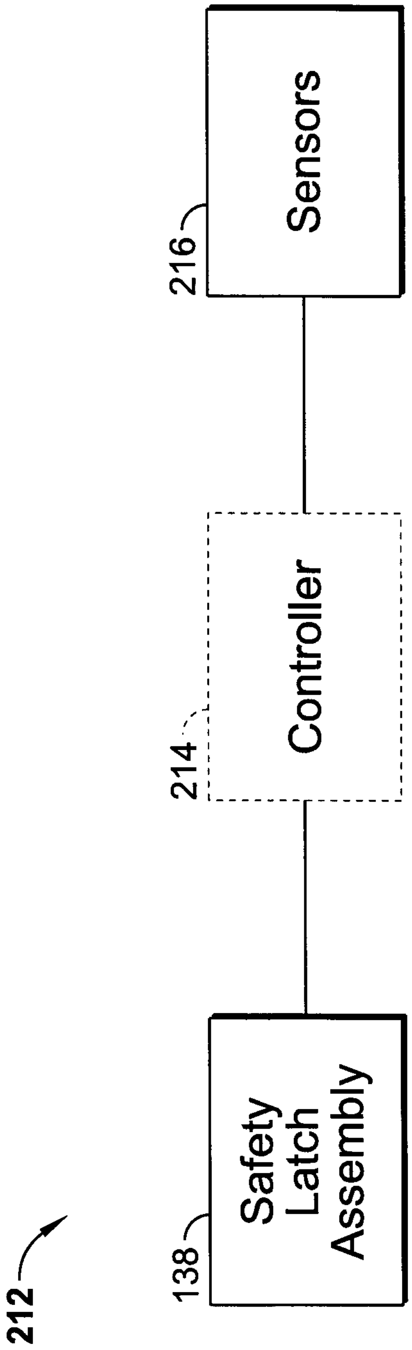
FIG. 25 is a diagram of a presence sensing system of the patient support system in communication with the safety latch assembly to permit unlocking only upon connection of appropriate support tops.

As shown in FIG. 24, the rotation lockout assembly 122 illustratively includes a key 174 in communication with the actuator 172 for selective engagement with the disk 132. The disk 132 illustratively includes a key hole 176 defined therein to receive the key 174. The key 174 is operable between a retracted position (as shown in FIG. 24) disengaged with the key hole 176, corresponding to the unlocked state of the rotation lockout assembly 122, and an extended position (as shown in FIG. 25) in which the key 174 extends into the disk 132 for reception in the key hole 176 (when the disk 132 is appropriately positioned) corresponding to the locked state of the rotation lockout assembly 122. The key 174 is illustratively mounted on the tower base 12 such that when the key 174 is received within the key hole 176, the disk 132 is blocked against rotation about axis 135.

In the illustrative embodiment as shown in FIG. 24, the actuator 172 includes an actuation arm 178 operable to drive the key 174 between the extended and retracted positions. The actuator 172 is illustratively embodied as a servo actuator providing rotatable articulation of the actuation arm 178 according to the operation of the trigger 140. In the illustrative embodiment, the actuator 172 is normally biased or resting to maintain the key 174 in the extended position and the rotation lockout assembly 122 in the locked state, unless the trigger 140 is depressed. When the trigger 140 is depressed, the actuator 172 articulates the actuation arm 178 (counter-clockwise in the orientation as shown in FIGS. 24 and 25) to retract the key 174 from the key hole 176 to release the disk 132 for rotation to place the rotation lockout assembly 122 in the unlocked state. In some embodiments, the actuator 172 having received a request for the unlocked state may perform safety checks before executing disengagement of the key 174, for example, may check with various other position sensors, may communicate with various processors for confirmation of sequence steps, and/or may perform any other suitable steps to reduce the risk of improper release of the disk 132 for rotation.

As shown in FIG. 25, the actuator 172 is illustratively arranged in communication with a patient top-presence sensing system 212 as a lockout control system adapted to determine whether upper and lower patient support tops 14, 20 are attached with the connection bars 16 before permitting rotation of the rotation disk 132 out of the locked position, for example, before permitting disengagement of the safety latch assembly 138. An example of a suitable presence sensing system is disclosed within U.S. P.G. Publication No. 2017/0027797, the contents of which are incorporated herein by reference, including but without limitation, those devices, systems, and methods for tracking accessories and/or functions of a patient support for selectively allowing user functions. The patient top-presence sensing system 212 illustratively includes one or more sensors 216 for detecting the presence of one or more components (e.g., patient support tops 14, 20) being attached to the connection bars 16. The sensors 216 are illustratively arranged on the connection bars 16 and provide a confirmation signal to the safety latch assembly 138 upon connection of a patient support top 14, 20 with the connection bars 16. The presence sensing system 212 may include an (optional) controller 214 communicatively coupled with the sensors 216 for determining the number and/or position of the patient support tops 14, 20 connected with the connection bars 16. The sensors 216 may be arranged to determine the number of components there attached, for example, may be located for activation by the distinct connection position of supine and prone support top 14, 20 with the connection bar 16. The sensors 216 for example, may include mechanical sensors, electrical sensors, electromechanical sensors and/or any other suitable type of sensors. The actuator 172 may be adapted to retract the key 174 only upon communication from the presence sensing system 212 that both support tops 14, 20 are properly connected with the connection bars 16.

Returning to FIGS. 24A and 24B, the rotation control assembly illustratively includes a switch 180 adapted to detect the position of the key 174. The switch 180 is illustratively embodied as a microswitch including an extension arm 182 selectively operable for extension (as shown in FIG. 24) when the key 174 is arranged in the extended position and retraction (as shown in FIG. 25) when the key 174 is arranged in the retraction position. The extension arm 182 illustratively contacts the key 174 with a bearing 184 and is driven for transition between its extension and retraction positions by engagement with a ramp 186 of the key 174. In the illustrative embodiment, the extension arm 182 closes a circuit of the switch 180 when in the retraction position to indicate that the key 174 is within the key hole 176 and thus that the disk 132 blocked against rotation and opens the circuit when arranged in the extension position to indicate that the key 174 is not within the key hole 176 and thus that the disk 132 not blocked against rotation. In some embodiments, the circuit may be closed in the extension position and open in the retraction position, and/or may have any suitable arrangement to indicate the key 174 position.

Figure 26:
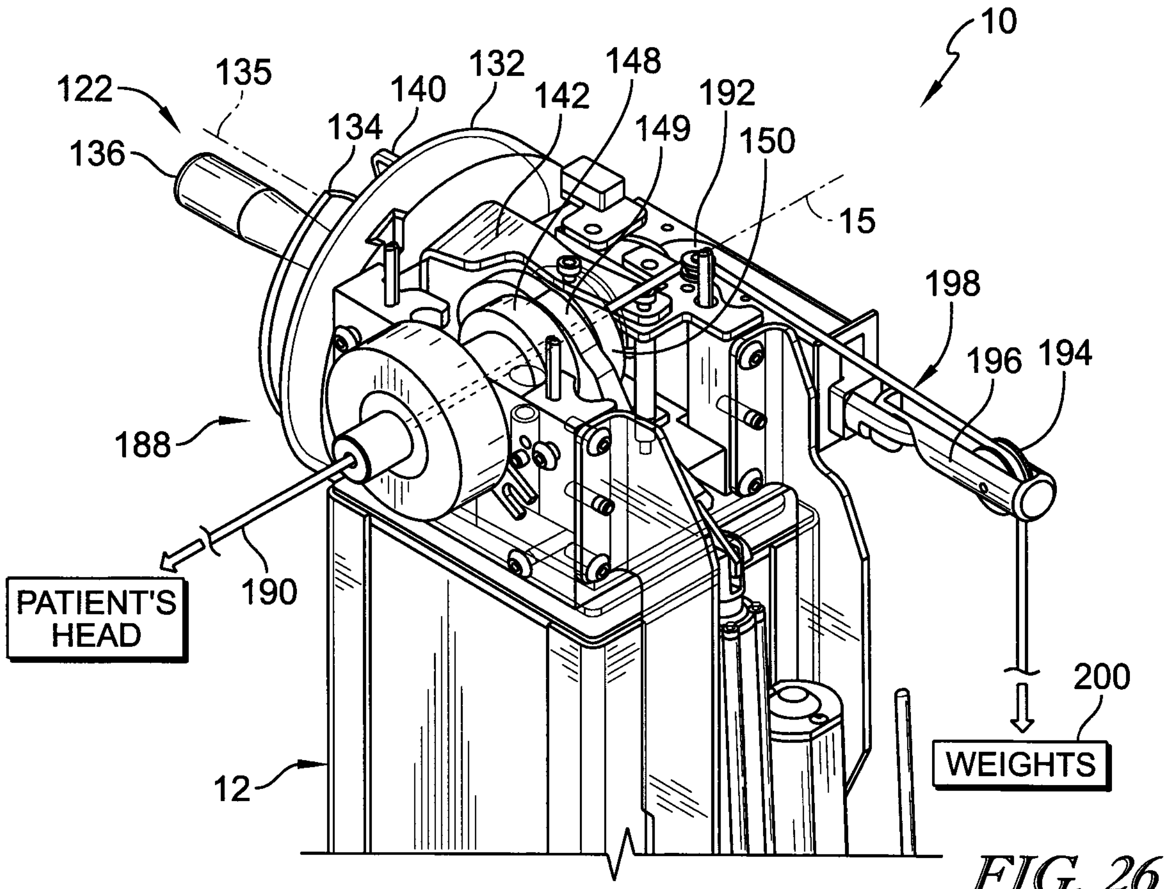
FIG. 26 is a perspective view of the tower base of FIGS. 1-25 with a portion removed to show that the patient support system includes a traction assembly for applying traction to a patient's body, the traction assembly including a tension line extends through the shaft and turning about pulleys to receive a traction load.

With reference to FIG. 26, the patient support system 10 is shown with outer portions of the tower base 12 removed to show that the patient support system 10 illustratively includes a traction assembly 188 for providing traction to a patient's head while occupying the patient support top 14, 20. The traction assembly 188 illustratively includes a tension line 190 and pulleys 192, 194 arranged to apply a traction load to the patient's head. The tension line 190 extends from the patient through the shaft 30 along the axis 15 to the pulley 192. The pulley 192 assists the tension line 190 to turn from the axial direction.

The traction assembly 188 illustratively includes a traction arm 196 that extends laterally from the tower base 12 (radially relative to axis 15 and illustratively parallel to axis 135). In the illustrative embodiment, the traction arm 196 extends from the tower base 12 on an opposite side from the grip 136. The traction arm 196 is illustratively connected with the tower base 12 by a hinged connection 198 allowing a user to collapse the traction arm 196 by folding the traction arm up for storage. The tension line 190 extends from the pulley 192 along the traction arm 196 to the pulley 194 to turn from the lateral direction towards the floor.

Figure 27:
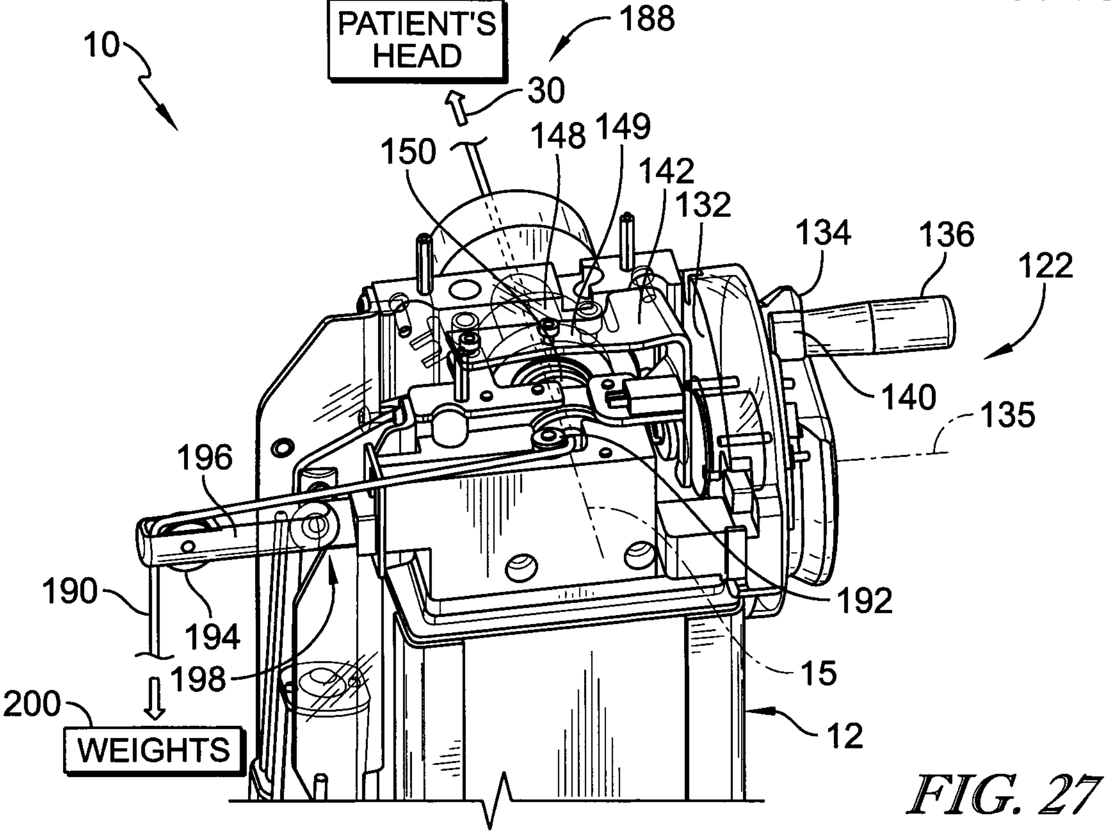
FIG. 27 is another perspective view of the tower base of FIG. 26 showing that the traction assembly includes a traction arm extending from the tower base to support one of the pulleys.

In the illustrative embodiment as shown in FIG. 27, a load 200, such as weights, can be secured with the tension line 190 to provide controlled traction force to the tension line 190. In some embodiments, any suitable load type may be applied such as an elastic band. By applying the tension line 190 through the shaft 30 while turning its path using the pulley 192, 194, traction can be precisely applied to the patient while ergonomically managing the load 200 lateral to the tower base 12.

Figure 28:
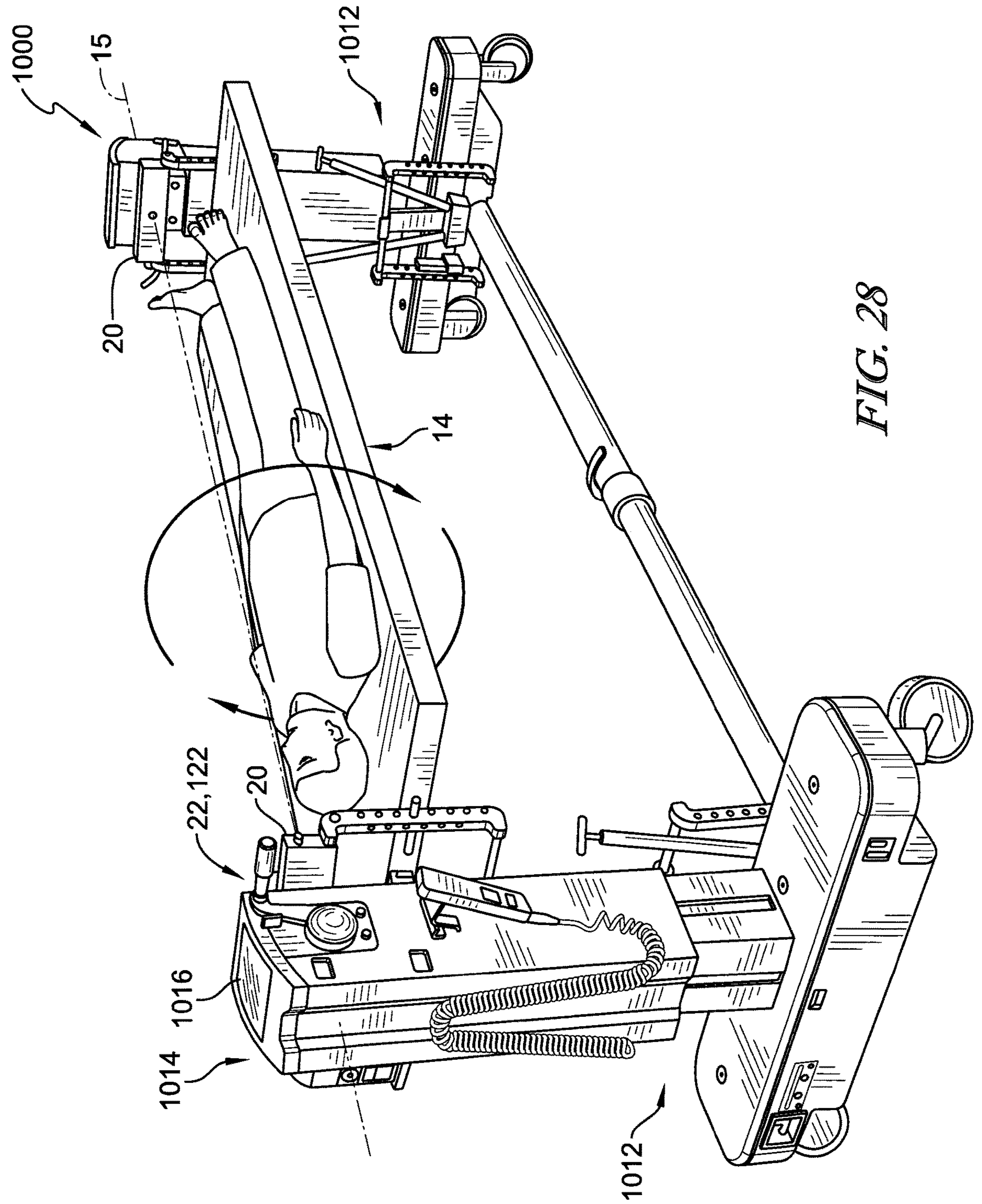
FIG. 28 is a perspective view of another illustrative embodiment of a patient support system including a user interface having a display for control of various parameters.

Referring now to FIG. 28, another illustrative embodiment of a patient support system 1000 is shown including a rotation lockout assembly 22, 122 similar to the patient support system 10 and the description of patient support system 10 applies equally to patient support system 1000 except in instances of conflict. Unlike the patient support system 10, the patient support system 1000 illustratively includes a user interface 1014 having a display 1016 for control of the patient support system 1000 parameters, for example, the height of the patient support top 14 above the floor.

Figure 29:
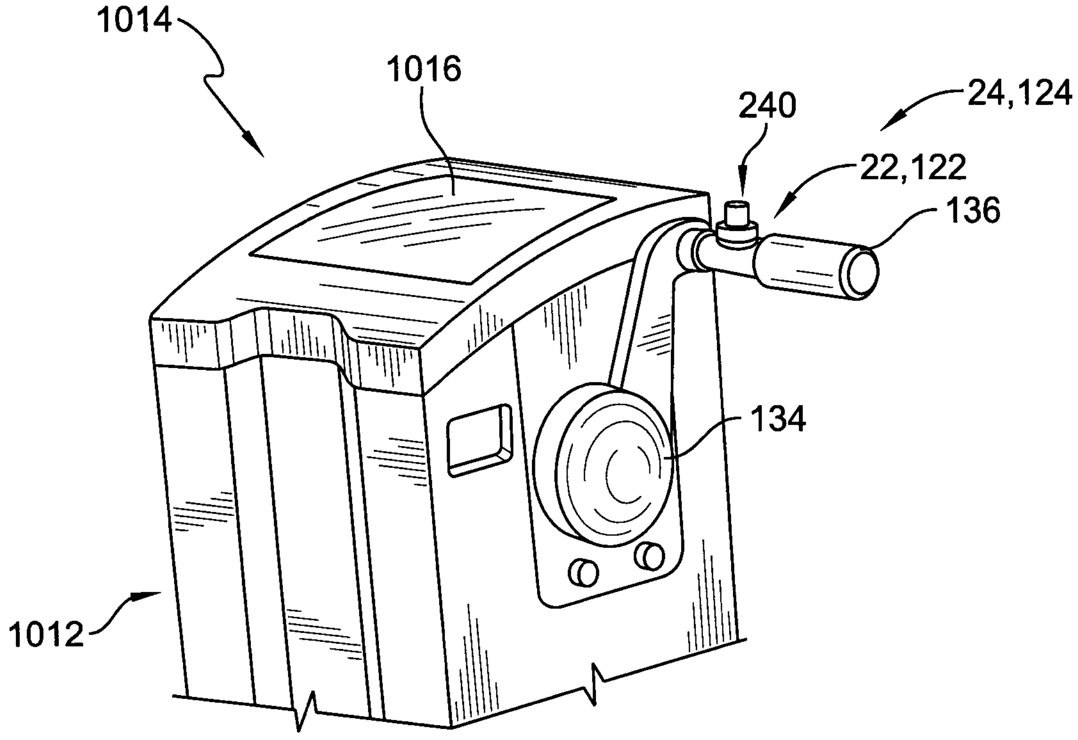
FIG. 29 is a closer perspective view of the user interface of the patient support system of FIG. 28 showing that the display is mounted on the tower base.

As suggested in FIG. 29, the display 1016 is illustratively embodied as a touch screen in communication with a processor (central processing unit) and memory device for storing instructions for execution by the processor. In the illustrative embodiment, safety lockout of the rotation lockout assembly 22, 122 can be controlled by the user interface 1014 by a user inputting commands on the display 1016 for execution by the processor. In the illustrative embodiment, a manual interface 24, 124 is operable to release the rotation lockout assembly 22, 122 for selectively blocking and permitting rotation of the patient support top 14 about the axis 15. In some embodiments, the manual interface 24, 124 remains manual, but the rotation of the patient support top 14 may be assisted and/or fully automated by an actuator configured to rotate the shaft 30 when the rotation lockout assembly 22, 122 is in the unlocked state. The safety latch assembly 138 is illustratively embodied to include a button 240 ergonomically arranged near the grip 136 for selectively depressing by a user to disengaged the safety latch assembly 138.

Figure 30:
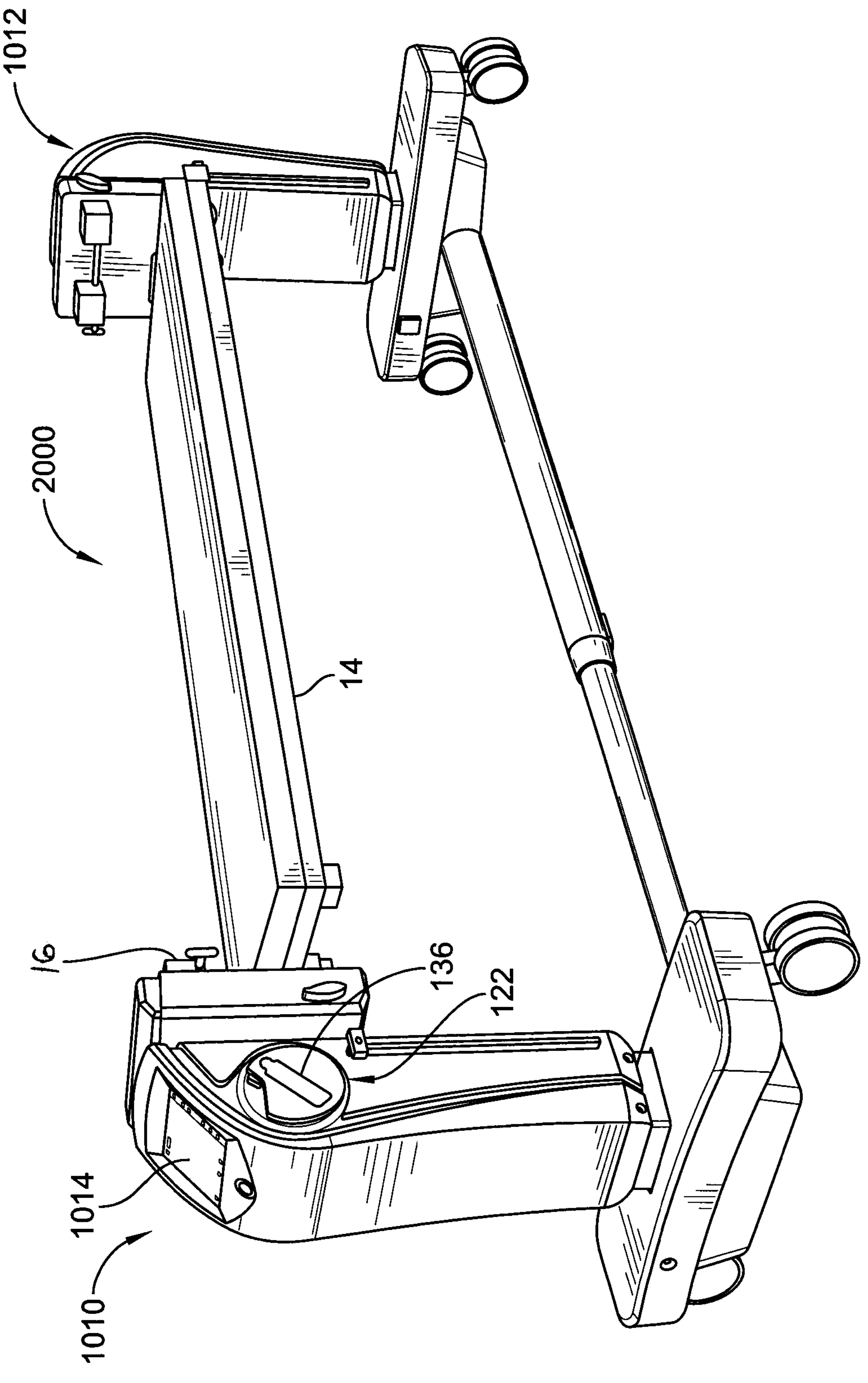
FIG. 30 is a perspective view of another illustrative embodiment of a patient support system having the user interface and including the rotation lockout assembly having a foldable crank handle.

As shown in FIG. 30, another illustrative embodiment of a patient support system 2000 is shown including a rotation lockout assembly 122 similar to the patient support systems 10, 1000 and the description of patient support systems 10,1000 applies equally to patient support system 2000 except in instances of conflict. The patient support system 2000 illustratively includes the user interface 1014 having the display 1016. The grip 136 of the manual interface 124 is illustratively folded down for storage.

Referring briefly to FIG. 8, the rotation lockout assemblies 22, 122 can illustratively include a position indicator assembly 127 having an indicator 129 and a sensor 131, one being affixed to the disk 132 and the other to the tower base 12 such that during the locked position of the disk 132, the positions of the sensor and indicator 131,129 correspond so that the sensor 131 detects the presence of the indicator 129 to send a signal indicating the locked position, and during a position of the disk 132 other than the locked position, the positions of the sensor and indicator 131,129 do not correspond so that the sensor 131 does not detect the presence of the indicator 129. The signal from the sensor 131 indicating the locked position can be required before permitting certain operation, for example, return of the key 174 to the extended position. The signal can also be used to control the color of the light device 133 to visually confirm the locked position of the disk 132.

In the illustrative embodiment, only one of the tower bases 12, 1012 includes the rotation lockout assembly 22, 122, but in some embodiments, the other tower base 12, 1012 may include another rotation lockout assembly and/or a rotation lockout assembly in communication with the rotation lockout assembly 22, 122 for operation.

Current operating room tables, for example, the Allen Advance Table (AAT) available from Allen Medical Systems, Inc. of Batesville, Indiana—and many other 2-column operating room tables indicated for complex spinal procedures—can allow the user to perform a 180 degree flip of the patient for procedures that require anterior and posterior incisions. The present disclosure includes devices, systems, and methods for performing a flip of a patient's body, including with the patient supported by a supine top (with the patient in the supine position) a secondary prone top is positioned above the patient, this prone top is then attached to the table and subsequently adjusted to secure or sandwich the patient in preparation for a flip; a member of the clinical staff can release a Flip Rotation Axis (FRA) of the table by activing a lever. Activating the lever can be achieved by a two-step process including depressing a safety button and pulling a trigger. In some embodiments, the safety button must first be depressed before pulling the trigger. Upon release of the FRA, the clinical staff can manually rolls the sandwiched patient 180 degrees, thereby flipping the patient. A member of the clinical staff can locks the FRA by re-engaging the lever. With the patient fully supported by the prone top, the supine top can be detached from the table.

As described above, releasing the FRA is necessary in order to flip the patient. Unintentional or unknowing release the FRA, the patient could be subjected to a hazardous situation, potentially resulting in patient harm. For example, if a patient is on the table and supported only by a single top (i.e. they are not sandwiched between two tops) and the FRA is released, the patient could be dropped. Additionally, if the patient is transferred from a gurney or stretcher to the table and the FRA is released, the patient could also be dropped. Although certain risks can be reduced by providing notification to the user that the FRA is released, without active lockout of the FRA from being released absent confirmation criteria, fall risks persist. Affirmative safety lockout can avoid releasing the FRA when there is only one top secure with the table.

The present disclosure can include a functional behavior of the table. If a user attempts to activate the lever to release the FRA without confirming the desire for release by at least one of additional input and confirmation signal, the FRA will not be permitted to release. For example, in some embodiments, release of the FRA requires depressing a safety trigger together with manual rotation of the rotation disk. In some embodiments, when a presence sensing system determines that there is only one patient support top connected with the connection bar of the table, the table will prevent the FRA from being released. The user will be notified that this release action is not allowed upon pressing the safety button (the first step in the process of activating the lever).

The present disclosure includes devices, systems, and methods for top presence sensing wherein the table can include one or more sensors to detect the number of support tops attached with the connection bars, for example, whether one or two tops are attached to the table. The present disclosure includes devices, systems, and methods for Flip Rotation Axis (FRA) lockout wherein the table can include an actuator and lockout assembly that can selectively allow or prevent the activation of the lever that releases the FRA. The present disclosure includes devices, systems, and methods for Graphical User Interface (GUI) wherein the table can include display means for displaying an indication that the FRA cannot be released in the event that there is one top on the table and the user presses the safety button (the first step in activating the lever). The present disclosure includes devices, systems, and methods for system on a module (SoM) and device communication to control and direct the system behavior.

Although certain illustrative embodiments have been described in detail above, variations and modifications exist within the scope and spirit of this disclosure as described and as defined in the following claims.

We claim:

1. A patient support apparatus comprising:

a patient support top for providing support to a patient's body, an end support configured to support the patient support top for selective rotation about a rotation axis, and a rotation lockout operable between a locked state to block against free rotation of the patient support top about the rotation axis and an unlocked state to permit free rotation of the patient support top about the rotation axis, the rotation lockout including a handle assembly movable between locked and unlocked positions corresponding respectively with the locked and unlocked states of the rotation lockout, the handle assembly include a rotatable base, a handle coupled to the rotatable base and configured to be grasped by a user's fingers, and a button coupled to the handle and moveable by the user's thumb in a direction substantially perpendicular to the handle to unlock the handle and rotation base for movement to change the rotation lockout from the locked state to the unlocked state.

2. The patient support apparatus of claim 1, wherein button is situated between the handle and the end support.

3. The patient support apparatus of claim 1, wherein handle the assembly includes a crank portion extending between the grip handle and the rotatable base, the grip handle extending in a cantilevered manner from the crank portion.

4. The patient support apparatus of claim 3, wherein the direction of movement of the button is substantially parallel with the crank portion.

5. The patient support apparatus of claim 3, wherein a lower end of the crank portion is coupled to the rotatable base and the handle is coupled to an upper end of the crank portion.

6. The patient support apparatus of claim 1, wherein the end support includes a primary shaft for supporting rotation of the patient support top and a rotation control assembly for controlled rotation of the primary shaft, the rotation control assembly including a rotation plate selectively fixed against rotation relative to the primary shaft when the rotation lockout is in the locked position.

7. The patient support apparatus of claim 6, wherein the rotation control assembly includes an actuator configured to provide controlled rotation to the rotation plate for transmission to the primary shaft when selectively fixed for rotation with the rotation plate.

8. The patient support apparatus of claim 1, wherein the rotation lockout includes at least one sensor arranged to detect connection of the patient support top with the end support.

9. The patient support apparatus of claim 8, wherein the rotation lockout blocks against free rotation of the patient support top unless the sensor indicates that the patent support top is connected with the end support.

10. The patient support apparatus of claim 1, wherein the patient support top includes two patient support tops, and further comprising at least one sensor configured to indicate that the two patent support tops are connected with the end support.

11. The patient support apparatus of claim 10, wherein the rotation lockout is blocked against operation out of the locked state unless the sensor indicates that the two patient support tops are connected with the end support and permits operation into the unlocked state in response to communication from the sensor that the two patent support tops are connected with the end support.

12. The patient support apparatus of claim 1, wherein the end support includes a primary shaft extending along the rotation axis to receive connection with support top, and a rotation control assembly including a rotation plate and an actuator adapted to provide controlled rotation to the rotation plate, the rotation plate selectively fixed for rotation with the primary shaft by operation of a locking collar between locked and unlocked positions corresponding respectively with the locked and unlocked states of the rotation lockout.

13. The patient support apparatus of claim 12, wherein the locking collar is movable according to the position of the button between an extended position in which the number of locking pins engage with each of the rotation plate and a flange of the primary shaft to rotationally fix the rotation plate and the flange together, and a depressed position in which the number of locking pins are disengaged from the flange of the primary shaft to release the rotation plate and the flange for relative rotation.

14. The patient support apparatus of claim 13, wherein the actuator of the rotation control assembly is configured to provide controlled rotation to the rotation plate for transmission of controlled rotation to the primary shaft when selectively fixed for rotation with the rotation plate.

15. The patient support apparatus of claim 1, wherein the end support is extendable and retractable to support the patient support top at different elevations and further comprising a user interface including a display for receiving user inputs to raise and lower the end support.

16. The patient support apparatus of claim 15, wherein the display includes a user input for receiving a selection from a user to provide controlled rotation of the patient support top relative to the end support.

17. The patient support apparatus of claim 15, wherein the display is mounted to an upper end of the end support and faces upwardly.

18. The patient support apparatus of claim 15, wherein the rotation lockout is also changeable from the locked state to the unlocked state in response to an unlock user input being selected on the display.

19. The patient support apparatus of claim 1, further comprising a user interface including a display for receiving user inputs and wherein the rotation lockout is also changeable from the locked state to the unlocked state in response to an unlock user input being selected on the display.

20. The patient support apparatus of claim 19, wherein the display is mounted to an upper end of the end support and faces upwardly.

* * * * *